United States Patent
Segawa et al.

(10) Patent No.: US 6,860,834 B2
(45) Date of Patent: Mar. 1, 2005

(54) ENGAGING FORCE CONTROL OF LOCKUP CLUTCH

(75) Inventors: Satoshi Segawa, Atsugi (JP); Kazutaka Adachi, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/660,488

(22) Filed: Sep. 12, 2003

(65) Prior Publication Data

US 2004/0082434 A1 Apr. 29, 2004

(30) Foreign Application Priority Data

Oct. 28, 2002 (JP) .................................. 2002-312405

(51) Int. Cl.[7] .............................................. B60K 41/02
(52) U.S. Cl. ........................ 477/180; 477/77; 477/84; 477/86
(58) Field of Search ........................... 477/77, 79, 83, 477/84, 86, 90, 180

(56) References Cited

U.S. PATENT DOCUMENTS

| | | | | |
|---|---|---|---|---|
| 4,582,185 A | * | 4/1986 | Grimes et al. ............. | 477/169 |
| 5,653,661 A | * | 8/1997 | Kato et al. .................. | 477/176 |
| 5,733,223 A | * | 3/1998 | Matsubara et al. ......... | 477/175 |
| 5,853,350 A | * | 12/1998 | Hasegawa et al. .......... | 477/166 |
| 6,066,072 A | | 5/2000 | Adachi | |

FOREIGN PATENT DOCUMENTS

| | | | | |
|---|---|---|---|---|
| JP | 2-203071 | * | 8/1990 | ............... 192/3.31 |
| JP | 5-71639 | * | 3/1993 | |

* cited by examiner

*Primary Examiner*—Ha Ho
(74) *Attorney, Agent, or Firm*—Foley & Lardner LLP

(57) ABSTRACT

A controller (12) controls the engaging force of a lockup clutch (2c) connecting an engine (1) and an automatic transmission (3) via an engaging force regulating mechanism (11, 13). The controller (12) sets a target relative rotation speed ($\omega_{SLPT}$) according to a difference between a target engine rotation speed (TGT_EREV) and an input rotation speed (PriREV) of the automatic transmission (3). When an initial engine rotation speed (ST_EREV) is smaller than the target engine rotation speed (TGT_EREV), the controller (12) causes the target relative rotation speed ($\omega_{SLPT}$) to gradually vary from an initial relative rotation speed (ST_SREV) to a predetermined target change-over relative rotation speed (CHG_REV). By controlling the engaging force regulating mechanism (11, 13) on the basis of the target relative rotation speed ($\omega_{SLPT}$) set in this way, a prompt and appropriate lockup operation of the lockup clutch (2c) is realized in response to the vehicle conditions.

10 Claims, 20 Drawing Sheets

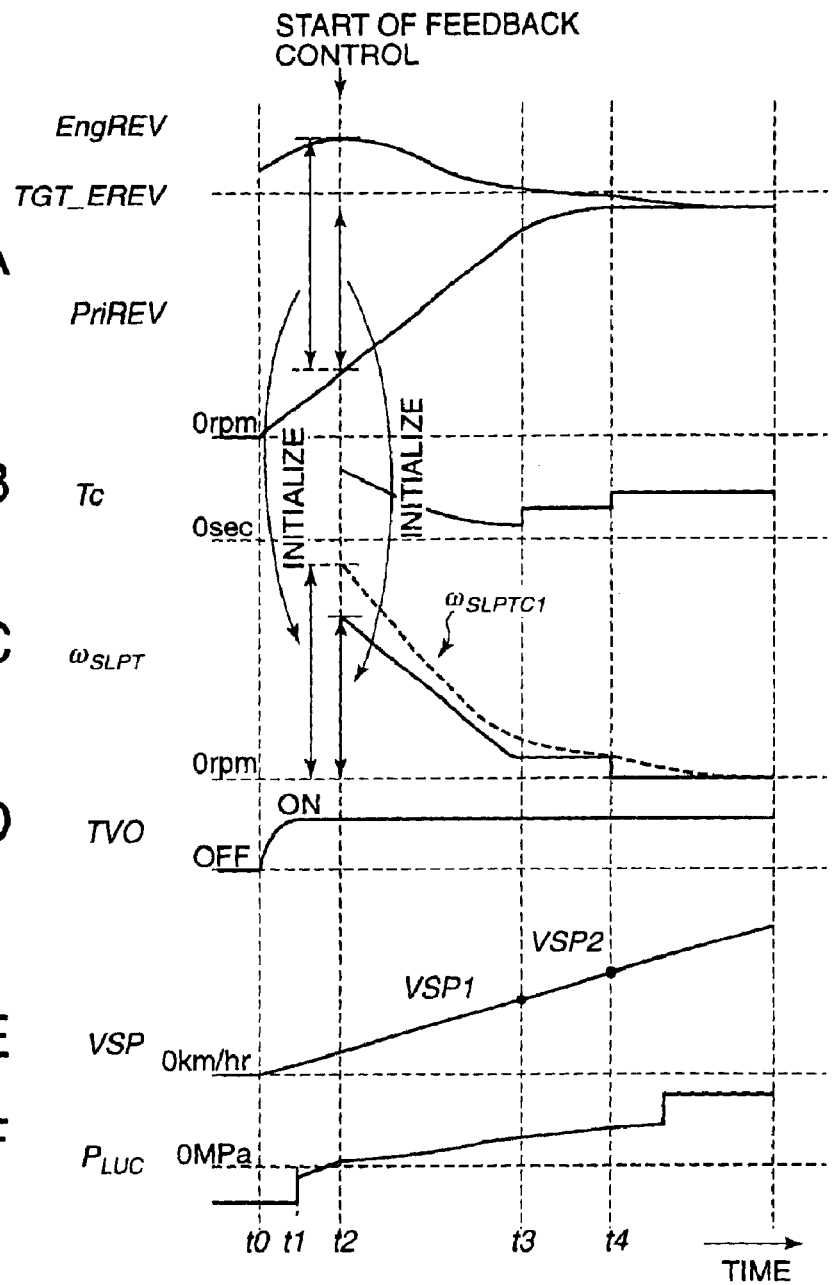

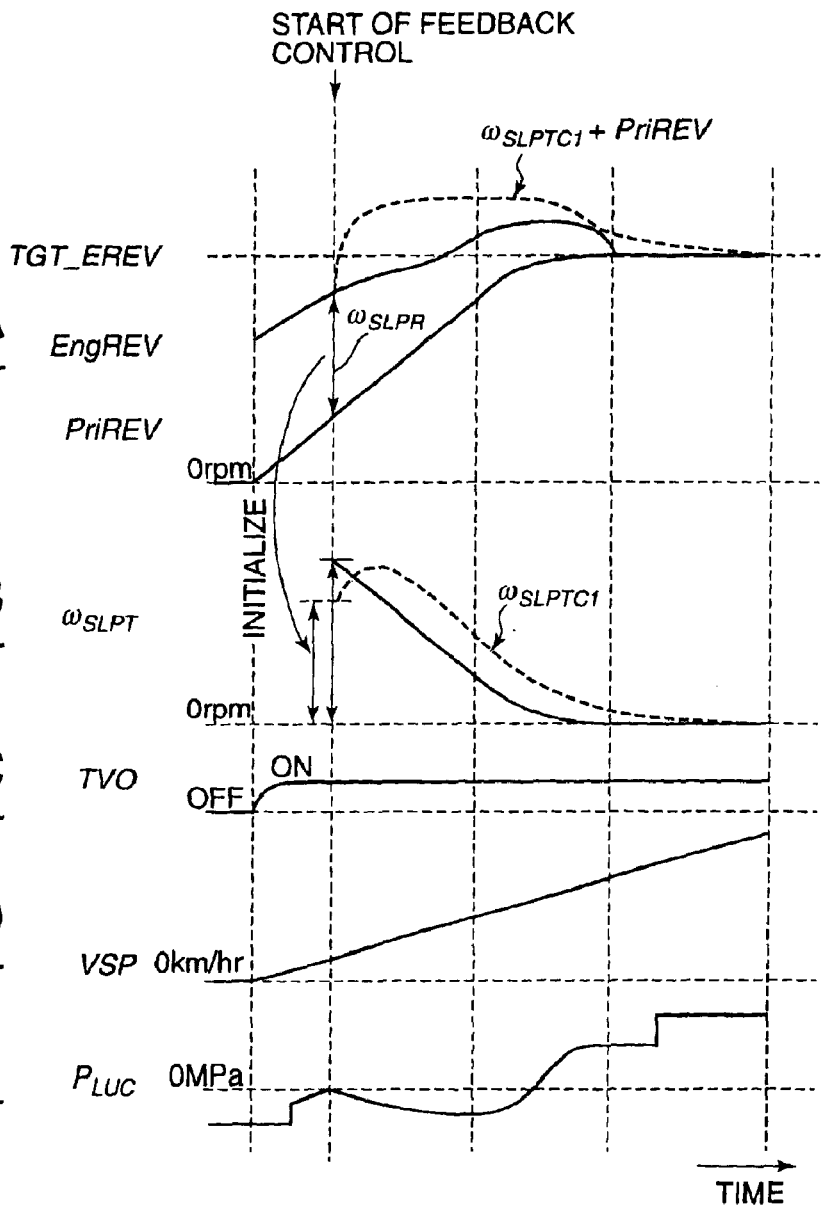

US 6,860,834 B2

ENGAGING FORCE CONTROL OF LOCKUP CLUTCH

FIELD OF THE INVENTION

This invention relates to control of a lockup clutch provided to a torque converter for a vehicle.

BACKGROUND OF THE INVENTION

A torque converter installed between an engine and an automatic transmission of a vehicle transmits torque between a pump impeller and a turbine runner via a fluid. Since the relative rotation between the pump impeller and the turbine runner increases fuel consumption of the engine, it is preferable to directly connect the pump impeller and the turbine runner soon after the vehicle is started up. A lockup clutch is provided to accomplish this purpose.

In a torque converter provided with a lockup clutch, a change-over between a converter mode where the torque is transmitted via a fluid and a lockup mode where the torque is transmitted via the lockup clutch is performed via a slip mode where a slip in the lockup clutch is allowed such that a part of the torque is transmitted via the fluid while the other part of the torque is transmitted via the lockup clutch. In the slip mode, a hydraulic pressure supplied to the lockup clutch and the engine operation is controlled in order to cause the relative rotation speed of the pump impeller and the turbine runner to gradually become zero.

SUMMARY OF THE INVENTION

In this context, U.S. Pat. Ser. No. 6,066,072 discloses a feedback control device of the relative rotation speed between the pump impeller and the turbine runner in the slip mode. This device sets a target relative rotation speed in the slip mode, and controls the hydraulic pressure supplied to the lockup clutch and the engine operation such that the deviation of the real relative rotation speed from the target relative rotation speed decreases. The device is provided with a pre-processing compensation unit which apples a first order delay to the target relative rotation speed in order to enhance control response characteristics while maintaining an appropriate redundancy to absorb the effect of engine rotation speed variation.

However, in this device, when the real variation of the relative rotation speed does not comply with a reference model applied to the pre-processing compensating unit, for example, when the engine rotation speed is low at the commencement of the slip mode, a target engine speed corresponding to the set target relative rotation speed will be much larger than the real engine rotation speed. The device then lowers the hydraulic pressure supplied to the lockup clutch in order to eliminate the deviation of the real engine rotation speed from the target engine rotation speed. If the hydraulic pressure supplied to the lockup clutch is lowered, however, a smooth engagement of the lockup clutch is not possible.

It is therefore an object of this invention to vary the target relative rotation speed of the pump impeller and the turbine runner when the slip mode is commenced according to the operation state of the vehicle.

In order to achieve the above object, this invention provides an engaging force control device of a lockup clutch for use with a torque converter for a vehicle. The lockup clutch engages a pump impeller connected to the engine with a turbine runner connected to an input shaft of an automatic transmission according to an engaging force. The engaging force control device comprises a sensor which detects an engine rotation speed (EngREV), a sensor which detects an input rotation speed (PriREV) of the automatic transmission, an engaging force regulating mechanism which regulates the engaging force of the lockup clutch; and a programmable controller.

The programmable controller is programmed to calculate a relative rotation speed ($\omega_{SLPR}$) of the pump impeller and the turbine runner from the engine rotation speed (EngREV) and the input rotation speed (PriREV) of the automatic transmission, compare an initial engine rotation speed (ST_EREV) which corresponds to an engine rotation speed when control of the engaging force is started, with a predetermined target engine rotation speed (TGT_EREV), set a target relative rotation speed ($\omega_{SLPT}$) when the initial engine rotation speed (ST_EREV) is equal to or greater than the predetermined target engine rotation speed (TGT_EREV), according to a difference between the target engine rotation speed (TGT_EREV) and the input rotation speed (PriREV) of the automatic transmission, set the target relative rotation speed ($\omega_{SLPT}$) when the initial engine rotation speed (ST_EREV) is smaller than the predetermined target engine rotation speed (TGT_EREV), to gradually vary from an initial relative rotation speed (ST_EREV) which corresponds to the relative rotation speed ($\omega_{SLPR}$) of the pump impeller and the turbine runner when control of the engaging force is started, to a predetermined target change-over relative rotation speed (CHG_SREV), and control the engaging force regulating mechanism such that the relative rotation speed ($\omega_{SLPR}$) coincides with the target relative rotation speed ($\omega_{SLPT}$)

This invention also provides an engaging force control method of a lockup clutch for use with a torque converter for a vehicle. The lockup clutch engages a pump impeller connected to the engine with a turbine runner connected to an input shaft of an automatic transmission according to an engaging force regulated by an engaging force regulating mechanism. The method comprises determining an engine rotation speed (EngREV), determining an input rotation speed (PriREV) of the automatic transmission, calculating a relative rotation speed ($\omega_{SLPT}$) of the pump impeller and the turbine runner from the engine rotation speed (EngREV) and the input rotation speed (PriREV) of the automatic transmission, comparing an initial engine rotation speed (ST_REV) which corresponds to an engine rotation speed when control of the engaging force is started, with a predetermined target engine rotation speed (TGT_EREV), setting a target relative rotation speed ($\omega_{SLPT}$), when the initial engine rotation speed (ST_EREV) is equal to or greater than the predetermined target engine rotation speed (TGT_EREV), according to a difference between the target engine rotation speed (TGT_ERE), and the input rotation speed (PriREV) of the automatic transmission, setting the target relative rotation speed ($\omega_{SLPT}$), when the initial engine rotation speed (ST_EREV) is smaller than the predetermined target engine rotation speed (TGT_EREV), to gradually vary from an initial relative rotation speed (ST_EREV) which corresponds to the relative rotation speed ($\omega_{SLPT}$) of the pump impeller and the turbine runner when control of the engaging force is started, to a predetermined target change-over relative rotation speed (CHG_SREV), and controlling the engaging force regulating mechanism such that the relative rotation speed ($\omega_{SLPT}$) coincides with the target relative rotation speed ($\omega_{SLPT}$).

The details as well as other features and advantages of this invention are set forth in the remainder of the specification and are shown in the accompanying drawings.

BRIEF DESCRIPTION OF THE DRAWINGS

FIGS. 23A–23F are timing charts describing a result of the engaging force control performed by the controller according to the second embodiment of this invention.

FIGS. 24A–24E are timing charts describing a result of the engaging force control according to a prior art engaging force control device.

DESCRIPTION OF THE PREFERRED EMBODIMENTS

Figure 1:
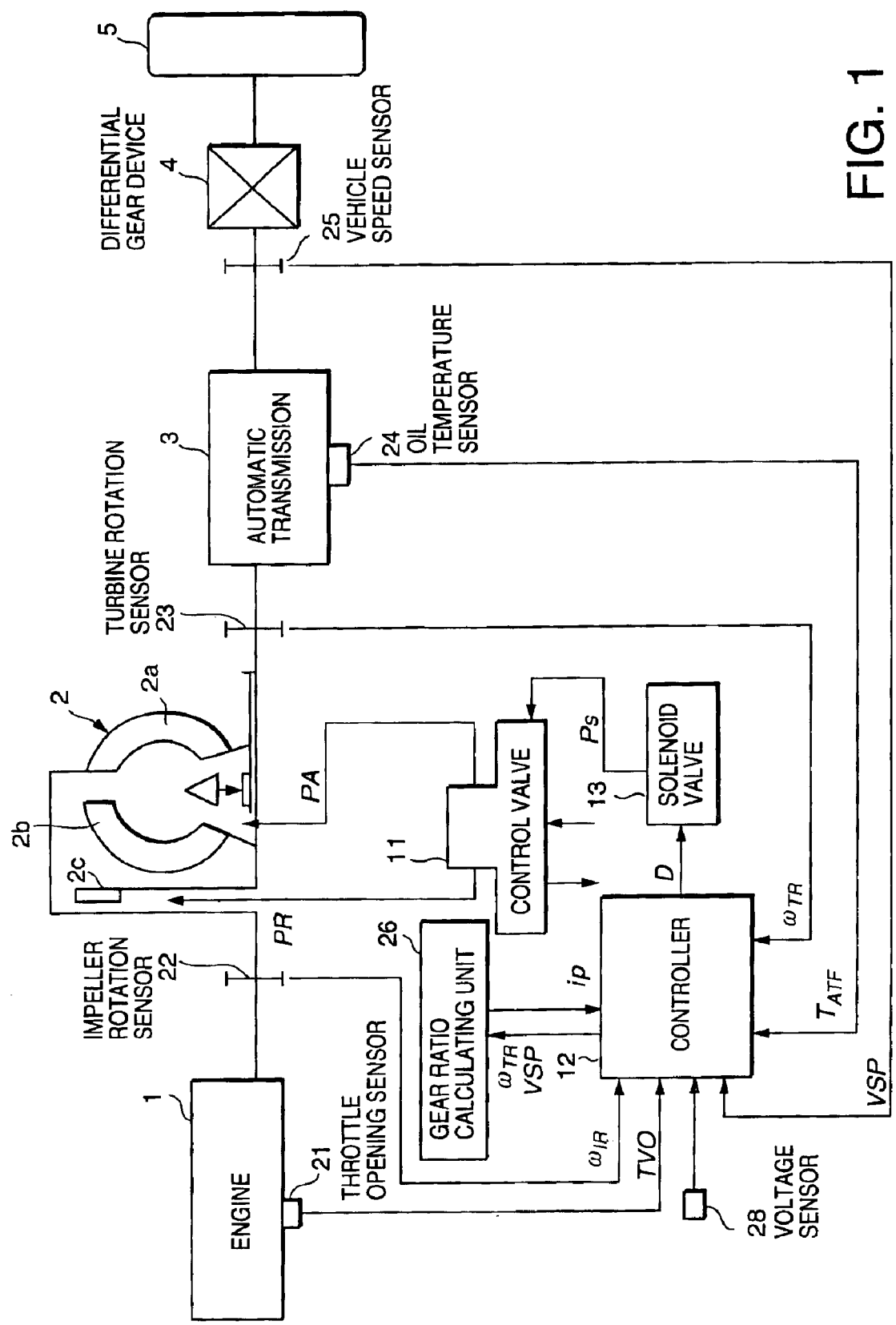
FIG. 1 is a schematic diagram of a vehicle power train provided with a lockup clutch to which this invention is applied.

Referring to FIG. 1 of the drawings, a multi-cylinder engine 1 for a vehicle is connected to an automatic transmission 3 via a torque converter 2, and the output of the automatic transmission 3 is transmitted to drive wheels 5 via a differential 4. Herein, the automatic transmission 3 is constituted by a continuously variable transmission.

The torque converter 2 comprises a pump impeller 2a driven by the engine 1, a turbine runner 2b connected to the input shaft of the automatic transmission 3, and a lockup clutch 2c which directly connects the turbine runner 2b with the pump impeller 2a.

The tightening force of the lockup clutch 2c is determined by the pressure difference between an application pressure PA and release pressure PR. These pressures are provided in the form of pressurized oil from a control valve 11.

If the application pressure PA is lower than the release pressure PR, the lockup clutch 2c is in a released state, and the pump impeller 2a and turbine runner 2b rotate due to the torque transmission function of the fluid interposed therebetween.

When the application pressure PA is higher than the release pressure PR, the lockup clutch 2c tightens according to the pressure difference.

When the pressure difference is small, a torque is transmitted according to the tightening power while the pump impeller 2a and turbine runner 2b undergo a relative rotation due to slip.

When the pressure difference increases beyond a set value, the pump impeller 2a and turbine runner 2b enter a lockup state without relative rotation.

Before a lockup state and while relative rotation is still possible, the torque converter 2 transmits torque in two ways, i.e. via the fluid and via mechanical transmission by the lockup clutch 2c. The engine output torque is equal to the sum of these torques.

Therefore, if the fluid transmission torque is subtracted from the engine output torque, the transmission torque via the lockup clutch 2c can be calculated.

The transmission torque of the lockup clutch 2c is expressed as a tightening capacity of the lockup clutch 2c.

The control valve 11 supplies the application pressure PA and release pressure PR to the lockup clutch 2c according to a signal pressure Ps input from a solenoid valve 13. The pressure difference between the application pressure PA and release pressure PR, i.e., the tightening pressure of the lockup clutch 2c, varies according to the signal pressure Ps.

The control valve 11 comprises a spool. The application pressure PA and a resilient force of a spring 11a are exerted on one end of the spool and the release pressure PR and the signal pressure Ps are exerted on the other side of the spool. The spool displaces according to the balance of these pressures and forces so as to generate the pressure difference PA−PR corresponding to the signal pressure Ps.

Figure 2:
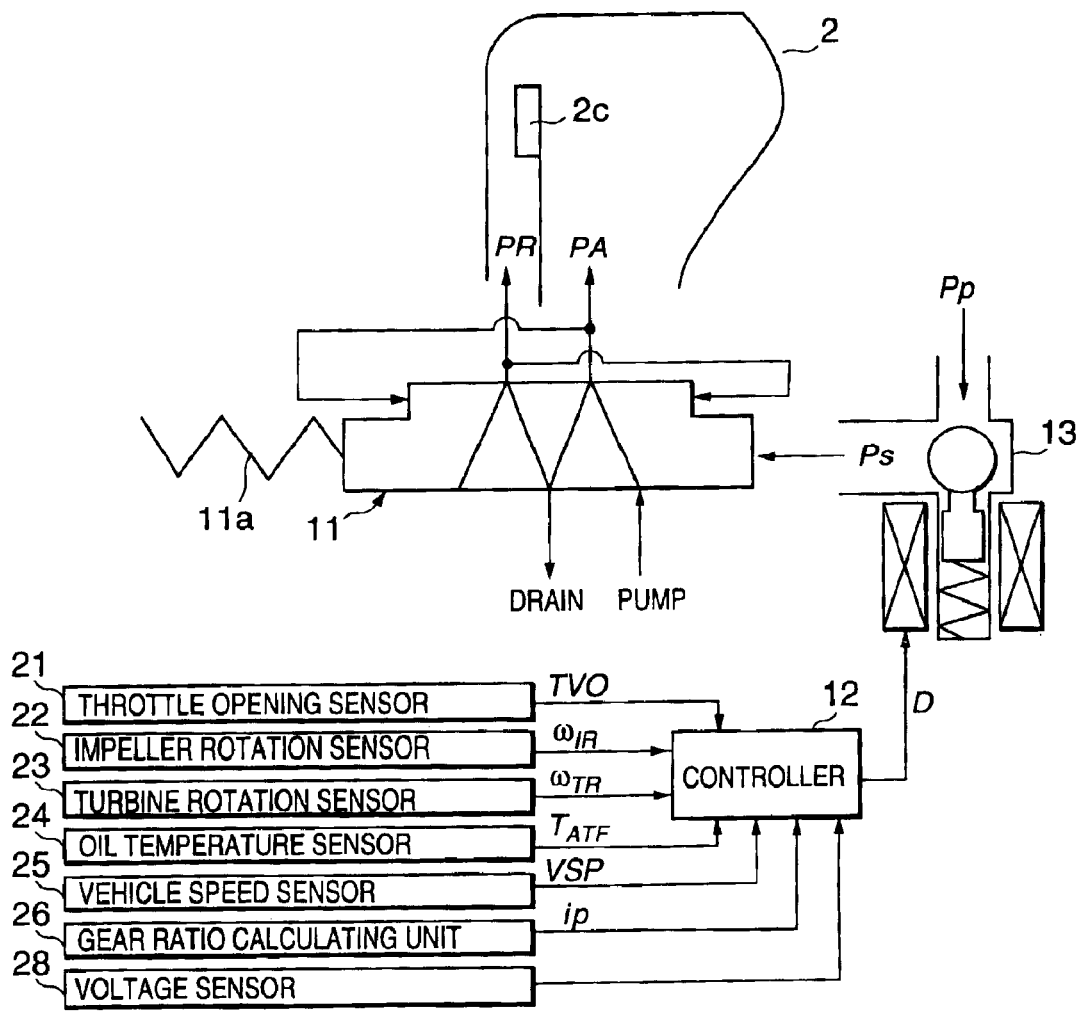
FIG. 2 is a schematic diagram of an engaging force control device according to this invention.

The solenoid valve 13 is duty controlled according to a duty signal D from a controller 12, and the corresponding signal pressure Ps is generated from a predetermined pilot pressure Pp as shown in FIG. 2. That is, the signal pressure Ps is increased as the duty ratio of the duty signal D increases.

To generate the duty signal D, signals are input to the controller 12 from a throttle opening sensor 21 which detects a throttle opening TVO of the engine 1, an impeller rotation sensor 22 which detects a rotation speed $\omega_{IR}$ of the pump impeller 2a, a turbine rotation sensor 23 which detects a rotation speed $\omega_{TR}$ of the turbine runner 2b, an oil temperature sensor 24 which detects an oil temperature $T_{ATF}$ in the automatic transmission 3, a vehicle speed sensor 25 which detects a vehicle speed VSP, a gear ratio calculating unit 26, and a voltage sensor 28 which detects a voltage of a power source which supplies electric power to the solenoid valve 13.

The rotation speed $\omega_{IR}$ of the pump impeller 2a is also used as an engine rotation speed EngREV. The rotation speed $\omega_{TR}$ of the turbine runner 2b is also used as an input rotation speed RriREV of the automatic transmission 3.

The gear ratio calculating unit 26 calculates a real gear ratio ip of the automatic transmission 3 from the rotation speed $\omega_{TR}$ of the turbine runner and the vehicle speed VSP, and inputs it to the controller 12.

The controller 12 comprises a microcomputer provided with a central processing unit (CPU), read-only memory ROM), random-access memory (RAM), and an input/output interface. The gear ratio calculating unit 26 also comprises a similar microcomputer.

The controller 12 may comprise plural microcomputers. The controller 12 and the gear ratio calculating unit 26 may also be realized by one microcomputer.

Figure 4:
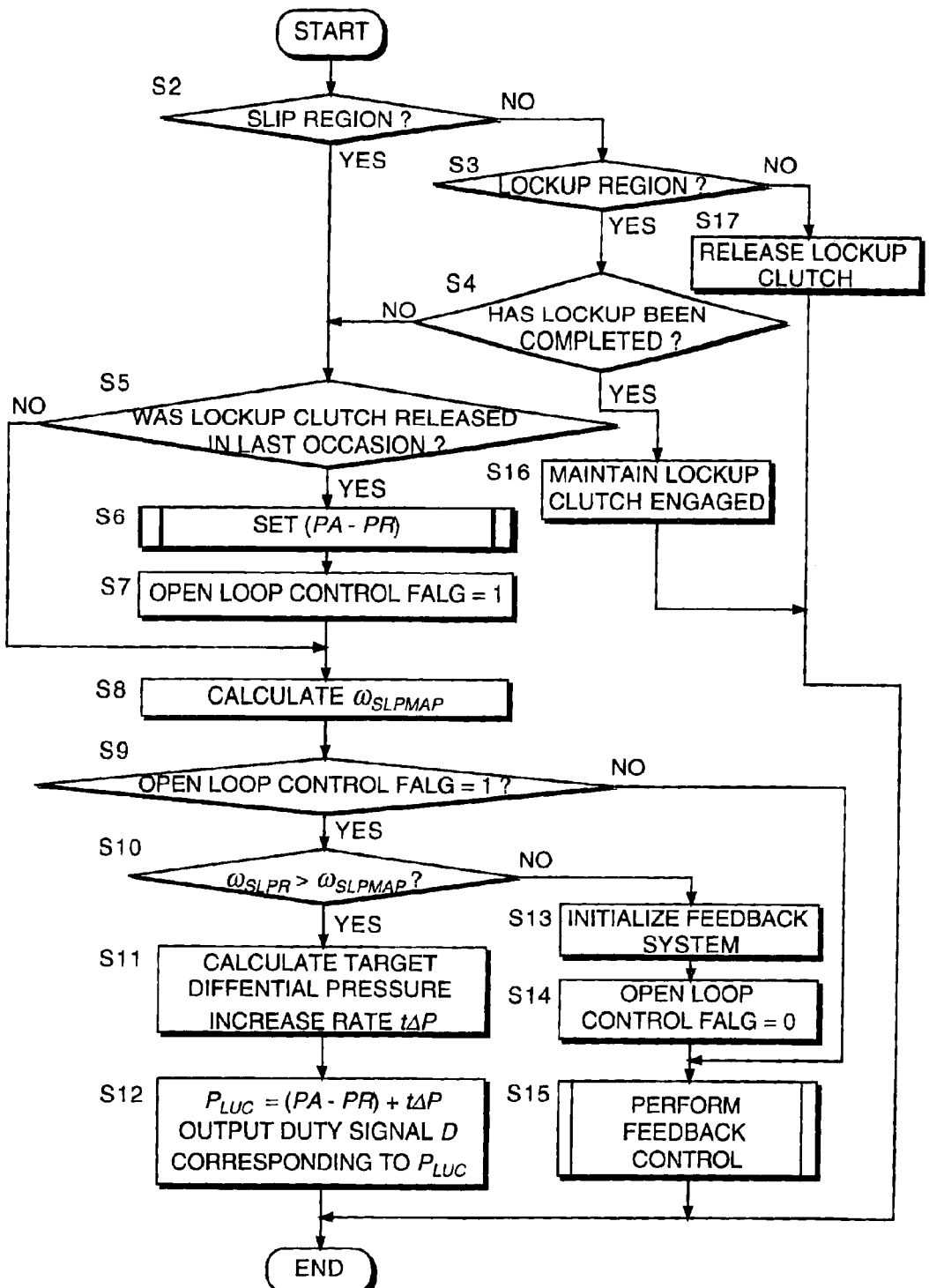
FIG. 4 is a flowchart describing an engaging force control routine executed by the controller.

The controller 12 generates the duty signal D on the basis of the above signals by performing an engaging force control routine shown in FIG. 4.

This routine is executed at intervals of twenty milliseconds when the engine 1 is operating.

Referring to FIG. 4, in a first step S2, the controller 12 determines whether or not the running condition of the vehicle corresponds to the slip region of the torque converter 2. Herein, the slip region corresponds to a region where the vehicle speed VSP is within a predetermined range while the throttle opening TVO is not larger than a predetermined opening TVO1.

When, in the step S2, the vehicle operating condition corresponds to the slip region, the controller 12 performs the processing of a step S5. When the vehicle operating condition does not correspond to the slip region, the controller 12 determines in a step S3 whether the vehicle operating condition corresponds to the lockup region. When the vehicle operating condition does not correspond to the slip region, it must correspond to the lockup region or converter region. In the step S3, when the vehicle speed VSP is less than a predetermined vehicle speed, it is determined that the operating condition corresponds to the converter region, and if the vehicle speed is not less than the predetermined vehicle speed, it is determined that the operating condition corresponds to the lockup region. The predetermined vehicle speed is herein set to five kilometers per hour (5 km/hr). When the operating condition does not correspond to the lockup region in the step S3, in other words, when it corresponds to the converter region, the controller 12 releases the lockup clutch 2c in a step S17.

Specifically, the differential pressure (PA–PR) is controlled so that the application pressure PA is lower than the release pressure PR. As a result, the output rotation of the engine 1 is exclusively transmitted to the automatic transmission 3 via the fluid in the torque converter 2. After the processing of the step S17, the controller 12 terminates the routine.

If the operating condition corresponds to the lockup region in the step S3, in a step S4, the controller 12 determines whether or not the lockup operation of the lockup clutch 2c has been completed. In other words, it determines if the differential pressure (PA–PR) of the lockup clutch 2c has reached a predetermined lockup differential pressure. As the differential pressure (PA–PR) is produced as a result of the duty signal D which the controller 12 outputs to the solenoid valve 13, the differential pressure (PA–PR) is a value known by the controller 12.

When the differential pressure (PA–PR) has reached the predetermined lockup differential pressure in the step S4, the lockup clutch 2c is locked up. In this case, in a step S16, the controller 12 maintains the differential pressure (PA–PR) at the lockup differential pressure. As a result, the output rotation of the engine 1 is transmitted to the automatic transmission 3 via the lockup clutch 2c in the lockup state. After the processing of the step S16, the controller 12 terminates the routine.

When the differential pressure (PA–PR) has not reached the predetermined lockup differential pressure in the step S4, it means that the lockup clutch 2c has not yet been locked up. In this case, the controller 12 performs the processing of the step S5 as in the case where the operating condition corresponds to the slip region.

In the step S5, the controller 12 determines whether the processing of the converter region, i.e., the release processing of the lockup clutch 2c of the step S17, was performed on the immediately preceding occasion the routine was executed. In other words, it is determined whether or not the step S5 is performed for the first time since the vehicle speed VSP exceeded 5 km/hour in the step S2.

Figure 5:
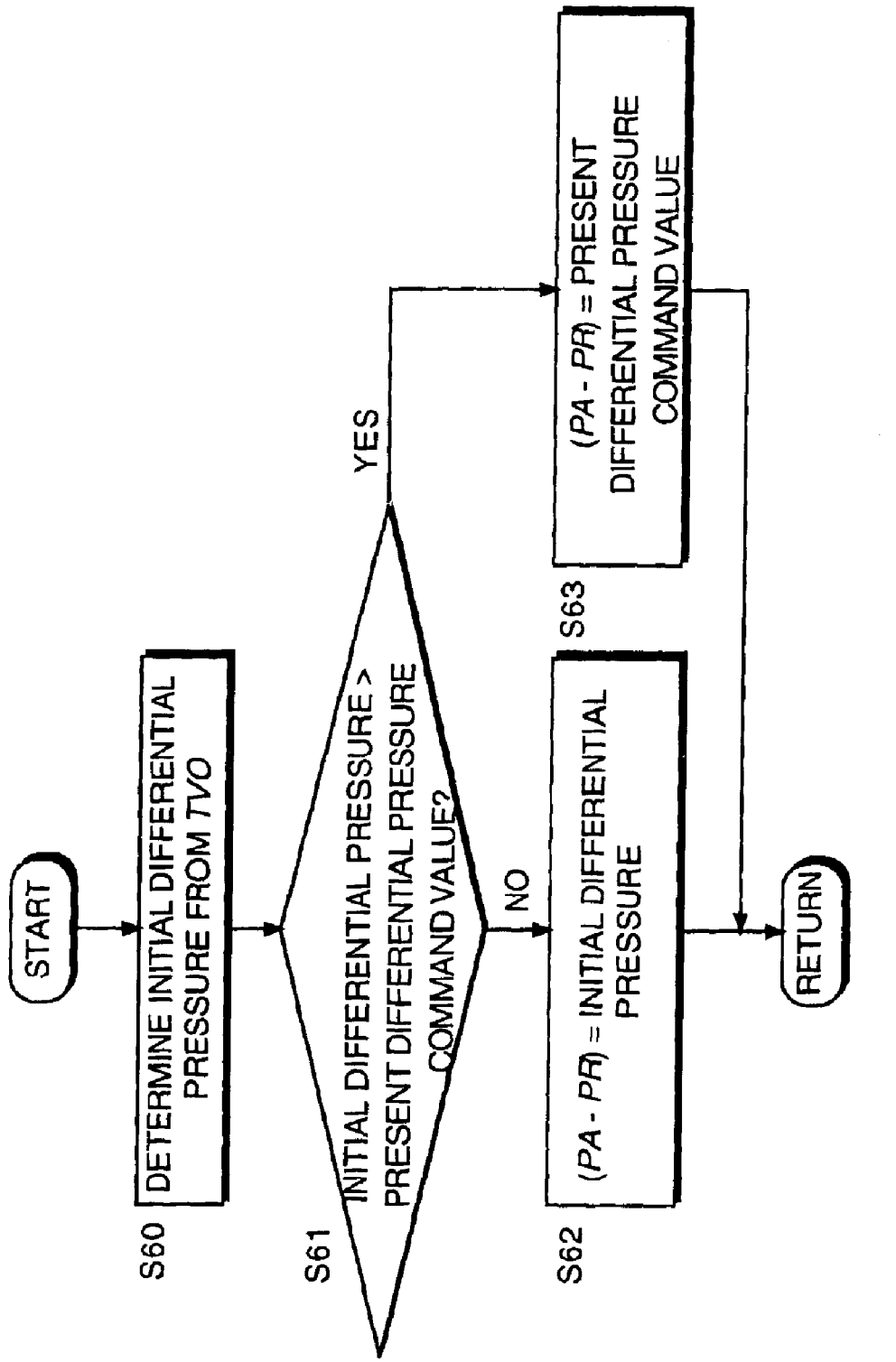
FIG. 5 is a flowchart describing a differential pressure setting subroutine executed by the controller.

If the processing of the converter region was performed on the immediately preceding occasion the routine was executed, in a step S6 the controller 12 sets the current differential pressure (PA–PR) using a subroutine shown in FIG. 5.

Figure 11:
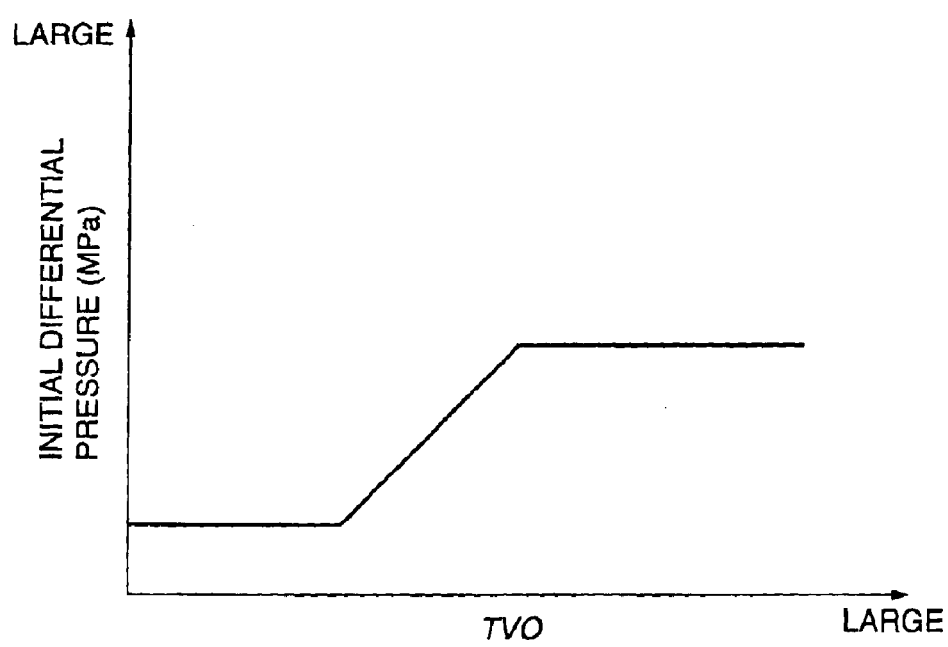
FIG. 11 is a diagram describing the characteristics of a map of an initial differential pressure stored by the controller.

Referring to FIG. 5, in a step S60, the controller 12 calculates an initial differential pressure of the lockup clutch 2c from the throttle opening TVO detected by the throttle opening sensor 21 by looking up a map having the characteristics shown in FIG. 11. This map is prestored in the memory (ROM) of the controller 12.

In a following step S61, the controller 12 determines whether or not the initial differential pressure is larger than the current differential pressure command value. The current differential pressure command value is the differential pressure corresponding to the newest duty signal D currently outputted to the solenoid valve 13 from the controller 12.

When the initial differential pressure is larger than the current differential pressure command value, in a step S62, the controller 12 sets the current differential pressure (PA–PR) to equal the initial differential pressure. When initial differential pressure is not larger than the current differential pressure command value, the controller 12 sets the current differential pressure (PA–PR) to equal the current differential pressure command value in a step S63. After the processing of the step S62 or the step S63, the controller 12 terminates the subroutine.

Referring again to FIG. 4, after setting the current differential pressure (PA–PR) in the step S6, in a step S7, the controller 12 sets an open-loop control flag to unity. The open-loop control flag is a flag which shows that open loop control of the differential pressure of the lockup clutch 2c is performed, and its initial value is zero.

After the processing of the step S7, the controller 12 performs the processing of a step S8. When the determination of the step S5 is negative, i.e., when processing of the converter region was not performed on the immediately preceding occasion the routine was executed, the controller 12 skips the steps S6 and S7, and performs the processing of the step S8.

Figure 12:
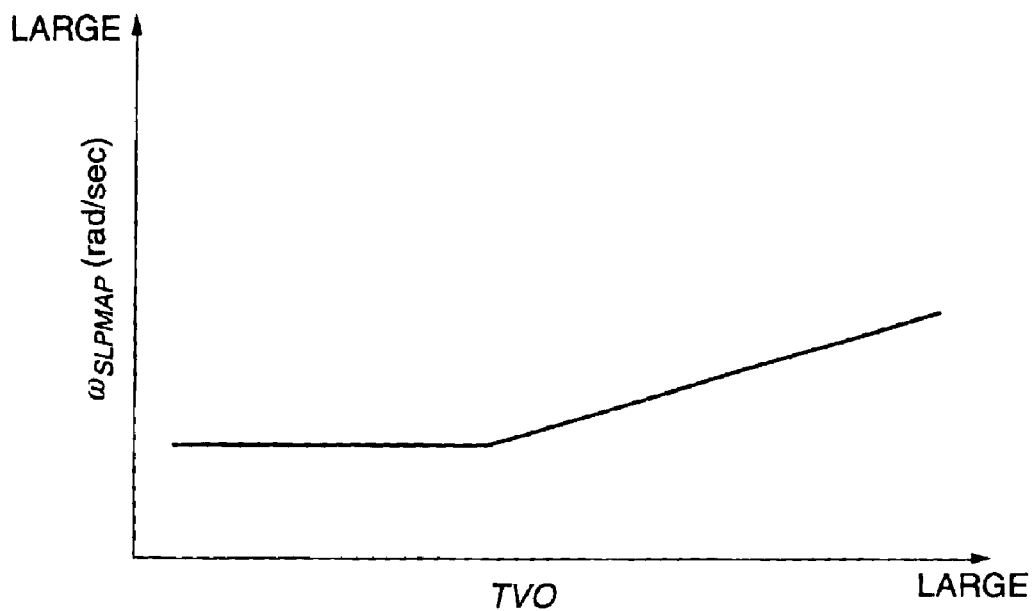
FIG. 12 is a diagram describing the characteristics of a map of an open-loop control cessation determination speed $\omega_{SLPMAP}$ stored by the controller.

In the step S8, the controller 12 calculates an open-loop control cessation determination speed $\omega_{SLPMAP}$ from the throttle opening TVO by looking up a map having the characteristics shown in FIG. 12. This map is prestored in the memory (ROM) of the controller 12. The open-loop control cessation determination speed $\omega_{SLPMAP}$ is the relative rotation speed of the pump impeller 2a and turbine runner 2b which is used to determine whether or not to terminate open loop control of the differential pressure (PA–PR) or, in other words, the engaging force of the lockup clutch 2. The open-loop control cessation determination speed $\omega_{SLPMAP}$ increases as the throttle opening TVO becomes larger, as shown in the figure.

In a next step S9, the controller 12 determines whether or not the open loop flag has a value of unity. When the open loop flag does not have a value of unity, it shows that the lockup clutch 2c is in the slip region, and open loop control is not performed. In this controller 12, open loop control is performed in the first half of the slip region, and feedback control is performed in the second half. When the open-loop control flag is not unity in the step S9, the controller 12 performs feedback control of the differential pressure (PA–PR) in a step S15. This feedback control is described later.

When the open loop flag is unity in the step S9, the controller 12 compares the open-loop control cessation determination speed $\omega_{SLPMAP}$ with the current real relative rotation speed $\omega_{SLPR}$ in a step S10. The real relative rotation speed $\omega_{SLPR}$ is the difference of the rotation speed $\omega_{IR}$ of the pump impeller 2a, and the rotation speed $\omega_{TR}$ of the turbine runner 2b.

When, as a result of this comparison, the real relative rotation speed $\omega_{SLPR}$ exceeds the open-loop control cessation determination speed $\omega_{SLPMAP}$, it means that the vehicle running condition is still the open-loop control condition of the differential pressure (PA–PR). In this case, the controller 12, in a step S11, calculates a target increase rate tΔP of the differential pressure (PA–PR) in open loop control.

Figure 13:
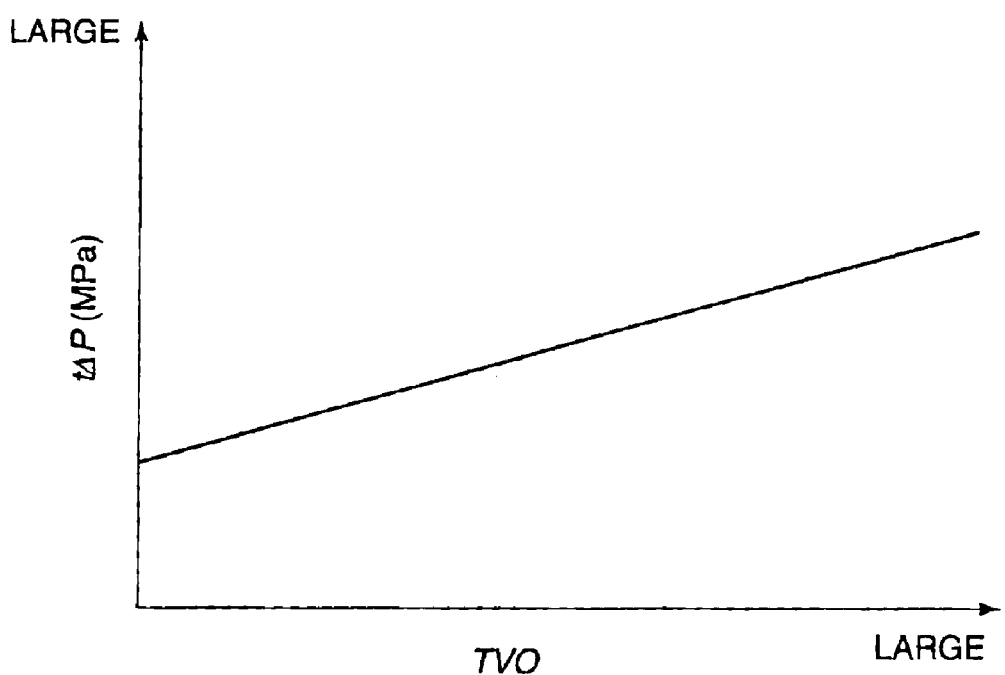
FIG. 13 is a diagram describing the characteristics of a map of a target increase rate tΔP stored by the controller.

This calculation is performed by looking up a map having the characteristics shown in FIG. 13 using the throttle opening TVO. This map is prestored in the memory (ROM) of the controller 12. According to FIG. 13, the target increase rate tΔP increases as the throttle opening TVO increases. Herein, the increase rate tΔP is set equal to 0.0012 megapascals (MPa) per twenty milliseconds when the throttle opening TVO is 0/8 and to 0.0035 megapascals (MPa) per twenty milliseconds when the throttle opening TVO is 8/8. Twenty milliseconds corresponds to the execution interval of the routine.

In a following step S12, the controller 12 sets a value obtained by adding the target increase rate tΔP to the current differential pressure (PA–PR) as a target differential pressure $P_{LUC}$, and outputs a duty signal D corresponding to the target differential pressure $P_{LUC}$ to the solenoid valve 13. After the processing of the step S12, the controller 12 terminates the routine.

On the other hand, when a real relative rotation speed $\omega_{SLPR}$ is not larger than the open-loop control cessation determination speed $\omega_{SLPMAP}$ in the step S10, the controller 12, in a step S13, initializes the feedback control system. This is a measure for shifting to feedback control from open loop control of the differential pressure (PA–PR).

In a following step S14, the controller 12 resets the open-loop control flag to zero.

In the following step S15, the controller 12 performs feedback control of the differential pressure (PA–PR). After the processing of the step S15, the controller 12 terminates the routine.

As described above, the processing of the steps S10-S12 corresponds to the open loop control of the differential pressure (PA–PR). The processing of the steps S13 and S14 corresponds to the change-over from open loop control to feedback control of the differential pressure (PA–PR). The processing of the step S15 corresponds to feedback control of the differential pressure (PA–PR).

Next, referring to FIG. 3, the feedback control of the signal D performed in the step S15 by the controller 12 will be described in detail.

Figure 3:
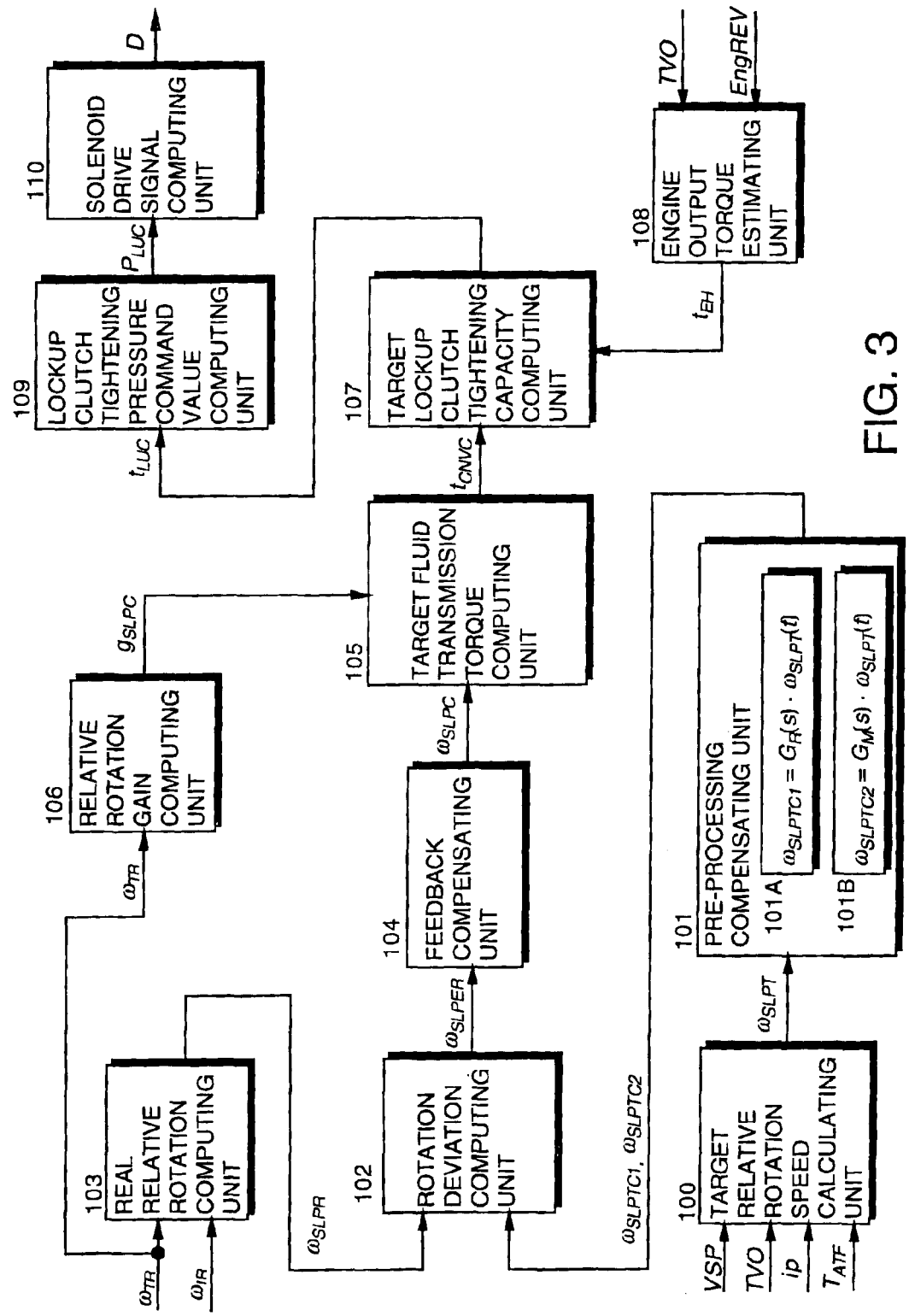
FIG. 3 is a block diagram describing the functions of a controller according to this invention.

The functions of the controller 12 for this purpose may be expressed by the blocks shown in FIG. 3. All the blocks shown in the figure are virtual units for the purpose of describing the function of the controller 12, and do not exist as physical entities.

A target relative rotation speed calculating unit 100 determines a target relative rotation speed $\omega_{SLPT}$ of the pump impeller 2a and turbine runner 2b based on the vehicle speed VSP, throttle opening TVO, gear ratio ip and oil temperature $T_{ATF}$. The target relative rotation speed $\omega_{SLPT}$ is the relative rotation speed which obtains a minimum fluctuation in the engine output torque due to scatter in the combustion of the engine 1 and a minimum pulsation noise emitted by the drive system. The determination of the target relative rotation speed $\omega_{SLPT}$ will be described later in detail.

A real relative rotation computing unit 103 computes the real relative rotation speed $\omega_{SLPR}$ of the torque converter 2 by subtracting the rotation speed $\omega_{TR}$ of the turbine runner 2b from the rotation speed $\omega_{IR}$ of the pump impeller 2a. Herein, the rotation speed of the pump impeller 2a is equivalent to the rotation speed of the engine 1 and the rotation speed of the turbine runner 2b is equivalent to the input rotation speed of the automatic transmission 3.

A pre-processing compensating unit 101 calculates a target relative rotation speed correction value $\omega_{SLPTC}$ by processing the target relative rotation speed $\omega_{SLPT}$ with a compensation filter so that the target relative rotation speed displays the intended response.

The pre-processing compensating unit 101 comprises a first unit 101A and a second unit 101B. The first unit 101A calculates a first target relative rotation speed correction value $\omega_{SLPTC1}$ from Equation (1) below.

$$\omega_{SLPTC1} = G_R(s) \cdot \omega_{SLPT}(t) \qquad (1)$$

$$\text{where, } G_R(s) = \frac{1}{1 + Tc \cdot s},$$

$Tc$ = time constant, and $s$ = differential operator.

Equation (1) corresponds to a first order delay processing. The determination of the time constant Tc will be described below.

The second unit 101B calculates a second target relative rotation speed correction value $\omega_{SLPTC2}$ from Equation (2) below.

$$\omega_{SLPTC2} = G_M(s) \cdot \omega_{SLPT}(t) \tag{2}$$

where, $G_M(s) = \dfrac{G_R(s)}{P(s)}$, $G_M(s)$ = feedforward compensator, and $P(s)$ = transfer function with respect to relative rotation model.

A rotation deviation computing unit 102 calculates the deviation $\omega_{SLPER}$ between the first target relative rotation speed 107 $_{SLPTC1}$ and the real relative rotation speed $\omega_{SLPR}$ as follows.

$$\omega_{SLPER} = \omega_{SLPTC1} - \omega_{SLPR} \tag{3}$$

A feedback compensating unit 104 calculates the first relative rotation speed command value $\omega_{SLPC1}$ on the basis of this deviation $\omega_{SLPER}$ using Equation (4) below which represents proportional/integral feedback control.

$$\omega_{SLPC1} = K_P \cdot \omega_{SLPER} + \dfrac{K_1}{s} \cdot \omega_{SLPER} \tag{4}$$

where, $K_P$ = proportional control constant, $K_1$ = integral control constant, and $s$ = differential operator.

In addition, the feedback compensating unit 104 calculates a target relative rotation speed command value $\omega_{SLPC}$ by adding the second target relative rotation speed correction value $\omega_{SLPTC2}$ to the first relative rotation speed command value $\omega_{SLPC1}$ in Equation (5) below.

$$\omega_{SLPC} = \omega_{SLPC1} + \omega_{SLPC2} \tag{5}$$

Figure 8:
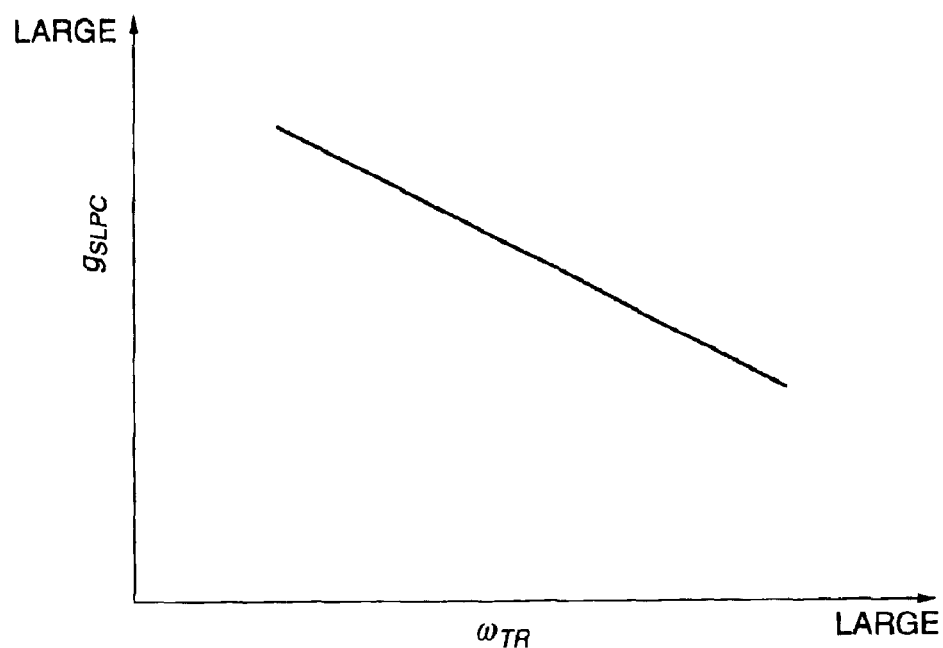
FIG. 8 is a diagram describing the characteristics of a map of a relative rotation gain $g_{SLPC}$ stored by the controller.

A relative rotation gain computing unit 106 uses the rotation speed $\omega_{TR}$ of the turbine runner 2b to calculate the relative rotation gain $g_{SLPC}$ by referring to a map having the characteristics shown in FIG. 8.

A target fluid transmission torque computing unit 105 calculates a target converter transmission torque $t_{CNVC}$ corresponding to the target relative rotation speed command value $\omega_{SLPC}$ using the relative rotation gain $g_{SLPC}$ using Equation (6) below.

$$t_{CNVC} = \dfrac{\omega_{SLPC}}{g_{SLPC}} \tag{6}$$

Figure 9:
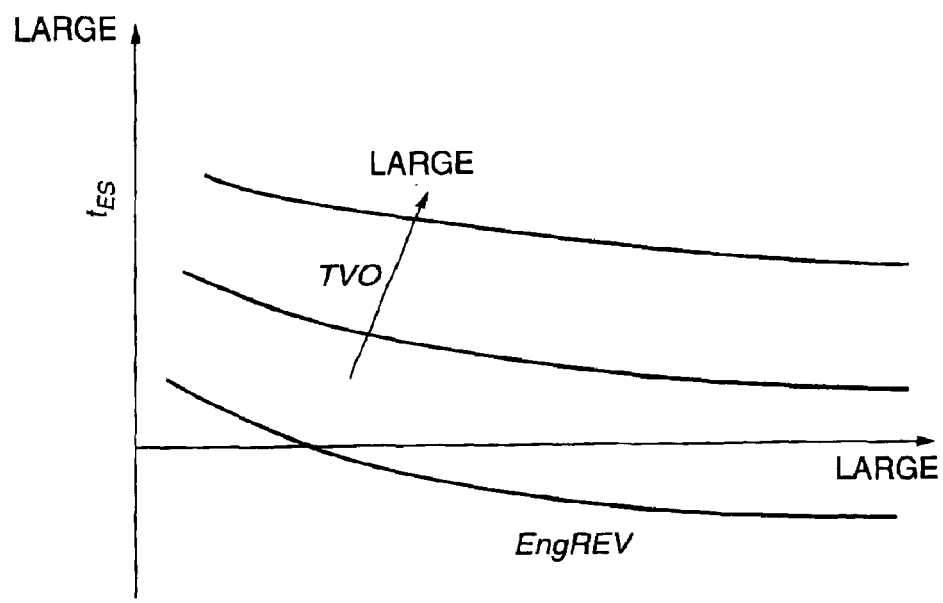
FIG. 9 is a diagram describing the characteristics of an engine performance map stored by the controller.

A engine output torque estimating unit 108 looks up an engine output torque $t_{ES}$ of the engine 1 by referring to a map having the characteristics shown in FIG. 9 based on the engine rotation speed EngREV and throttle opening TVO.

This value is filter processed by Equation (7) below using a time constant $T_{ED}$ taking account of a first order delay of the engine dynamics to obtain an engine torque estimated value $t_{EH}$.

$$t_{EH} = \dfrac{1}{1 + T_{ED} \cdot s} \cdot t_{ES} \tag{7}$$

A target lockup clutch tightening capacity computing unit 107 computes a target lockup clutch tightening capacity $t_{LUC}$ by subtracting the target fluid transmission torque $t_{CNVC}$ in Equation (6) from the engine output torque estimated value $t_{EH}$ obtained as described above $$t_{LU} = t_{EH} - t_{CNVC} \tag{8}$$

Figure 10:
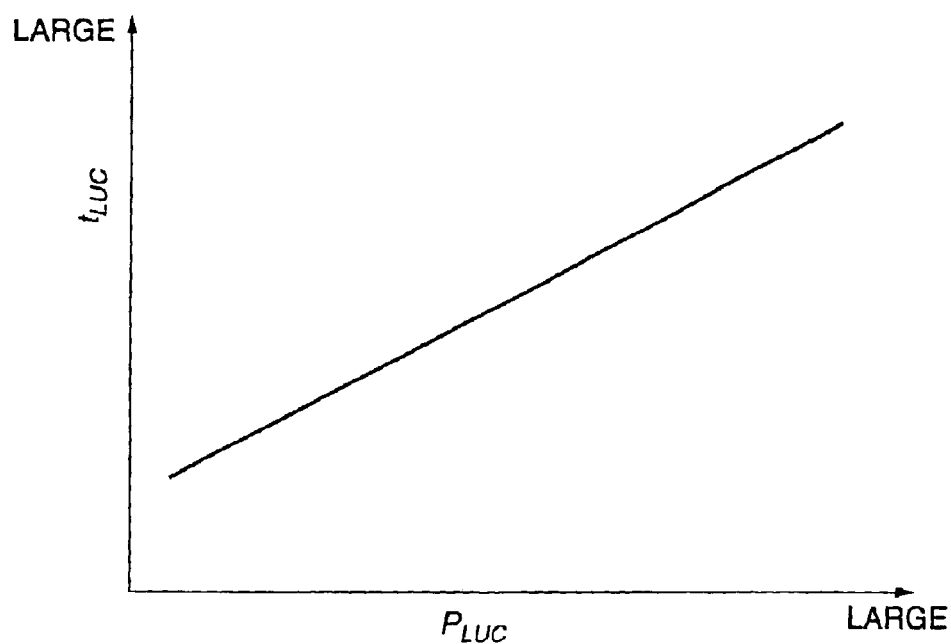
FIG. 10 is a diagram describing the characteristics of a map of a tightening capacity $t_{LUC}$ of the lockup clutch stored by the controller.

A lockup clutch tightening pressure command value computing unit 109 calculates a lockup clutch tightening pressure command value $P_{LUC}$ required to achieve the target lockup clutch tightening capacity $t_{LUC}$ by referring to a map having the characteristics shown in FIG. 10.

This map is drawn up in advance on the basis of experimental results regarding the relation between the tightening pressure and tightening capacity of the lockup clutch 2c.

A solenoid drive signal computing unit 110 calculates a lockup duty $S_{DUTY}$ based on the lockup clutch tightening pressure command value $P_{LUC}$, and outputs a corresponding duty signal D to the solenoid valve 13.

Next, referring to FIG. 6, a subroutine for setting the target relative rotation speed $\omega_{SLPT}$ will be described. This subroutine corresponds to the function of the target relative rotation speed calculating unit 100 and is performed by the controller 12 as a part of the step S15 of FIG. 4.

Figure 14:
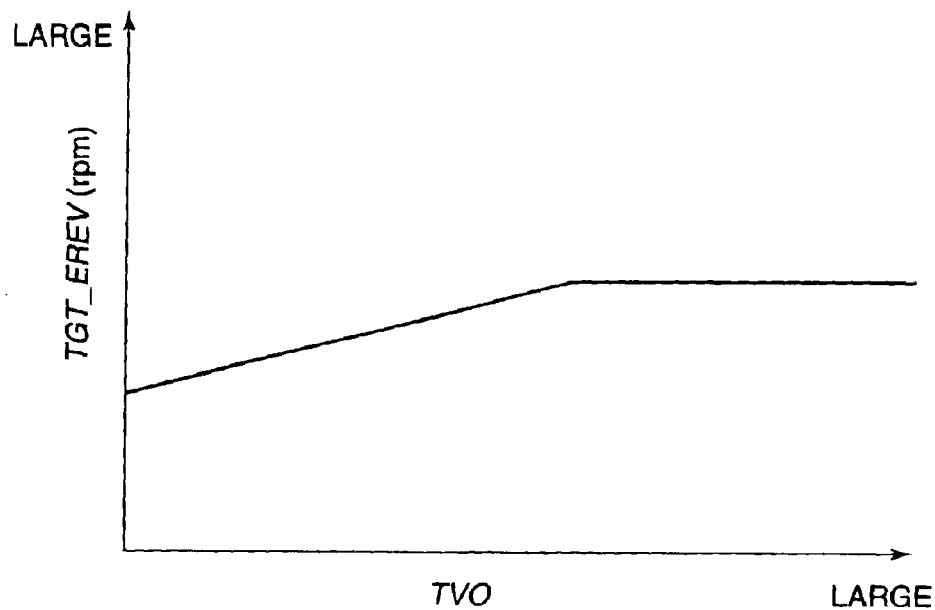
FIG. 14 is a diagram describing the characteristics of a map of a target engine rotation speed TGT_EREV stored by the controller.

First, in a step S21, the controller 12 sets a target engine rotation speed TGT_EREV from the throttle opening TVO by looking up a map having the characteristics shown in FIG. 14. This map is set such that the engine rotation speed undergoes continuous variation when the lockup clutch 2c engages from a slipping state, and is prestored in the memory (ROM) of the controller 12.

In a next step S22, the controller 12 sets a target relative rotation speed lower limit LMT_SREV according to the throttle opening TVO. Herein, LMT_SREV is set equal to 40 revolutions per minute (rpm) when the throttle opening TVO is 1/8, and LMT_SREV is set equal to 120 revolutions per minute (rpm) when the throttle opening TVO is 8/8.

In a next step S23, the controller 12 determines whether or not the current occasion is the first occasion the subroutine is executed. When the current occasion is the first occasion the subroutine is executed, the controller 12 executes the processing of a step S24. When the present occasion is not the first occasion the subroutine is executed, the controller 12 executes the processing of a step S26.

In the step S24, the controller 12 stores the engine rotation speed EngREV as an initial engine rotation speed ST_EREV, the input rotation speed PriREV of the automatic transmission 3 as an initial input rotation speed ST_PREV of the automatic transmission 3, and the real relative rotation speed $\omega_{SLPR}$ as an initial relative rotation speed ST_SREV. These initial values are respectively stored in the memory (RAM). These initial values are referred to when the target relative rotation speed $\omega_{SLPT}$ and the time constant Tc are determined later.

In a next step S25, the controller 12 sets an initial value ST_TC of the time constant Tc. The setting is performed according to the initial engine rotation speed ST_EREV and the target engine rotation speed TGT_EREV by executing a subroutine of FIG. 7.

Figure 7:
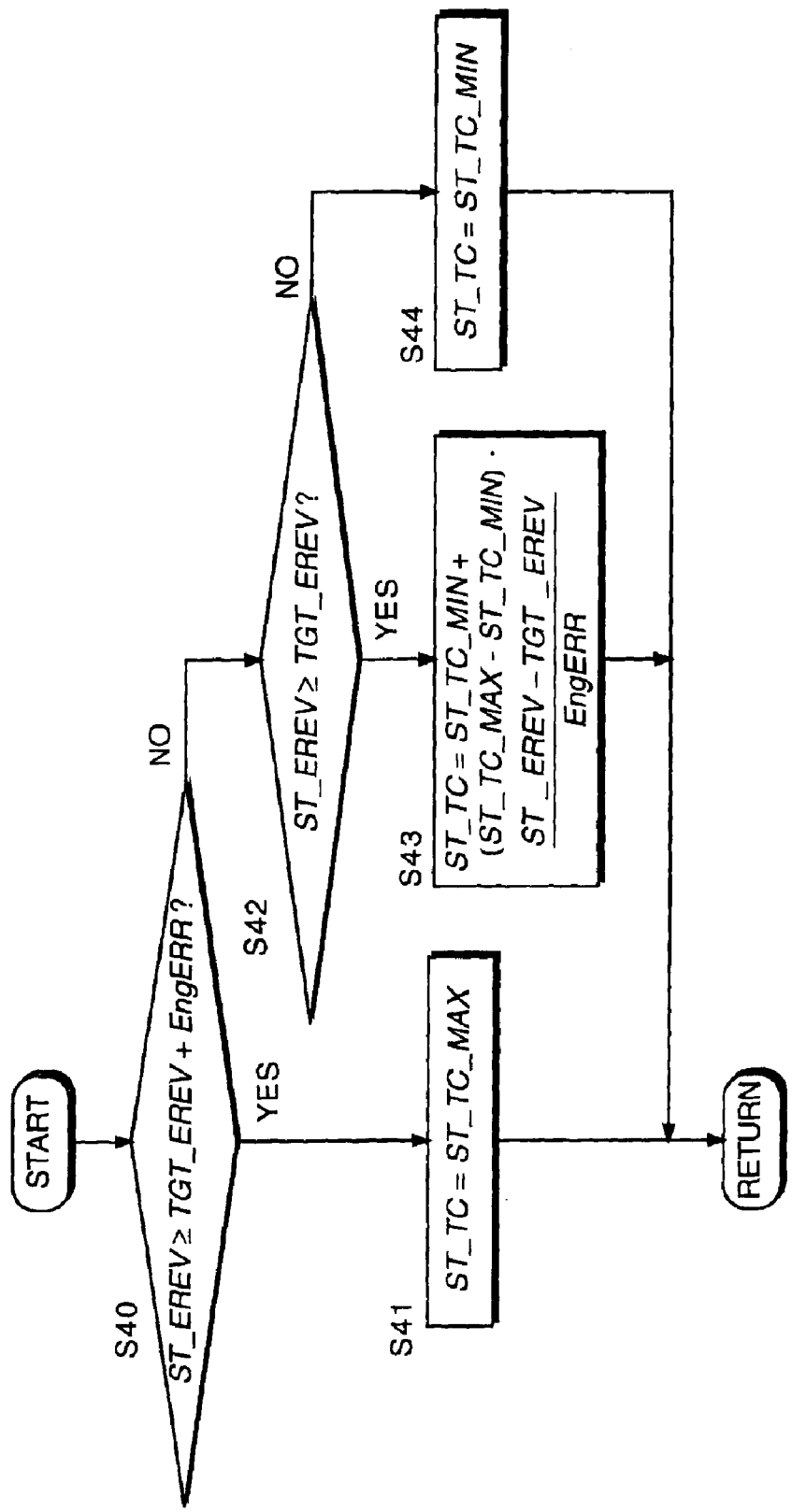
FIG. 7 is a flowchart describing a subroutine for setting an initial value ST_TC of the time constant Tc executed by the controller.

Referring now to FIG. 7, the controller 12 in a first step S40 determines if the initial engine rotation speed ST_EREV is equal to or larger than the sum of the target engine rotation speed TGT_EREV and a maximum deviation EngERR which is a predetermined constant.

When the determination result of the step S40 is affirmative, the controller 12 executes the processing of a step S41. When the determination result of the step S40 is negative, the controller 12 executes the processing of a step S42.

In the step S41, the controller 12 sets the initial value ST_TC of the time constant Tc to equal a maximum value ST_TC_MAX.

In the step S42, the controller 12 determines if the initial engine rotation speed ST_EREV is equal to or larger than the target engine rotation speed TGT_EREV. When the determination result is negative, the controller 12 sets the initial value ST_TC of the time constant Tc to equal a minimum value ST_TC_MIN in a step S44. When the determination result is affirmative, the controller 12 sets the initial value ST_TC of the time constant Tc in a step S43 to a value between the maximum value ST_TC_MAX and the minimum value ST_TC_MIN using Equation (9) below.

$$ST\_TC = ST\_TC\_MIN + (ST\_TC\_MAX - ST\_TC\_MIN) \cdot \frac{ST\_EREV - TGT\_EREV}{EngERR} \quad (9)$$

According to this processing, at the beginning of the feedback control of the differential pressure (PA–PR), when the initial engine rotation speed ST_EREV is larger than the target engine rotation speed TGT_EREV, the time constant Tc is set to a large value. At the beginning of the feedback control of the differential pressure (PA–PR), when the initial engine rotation speed ST_EREV is smaller than the target engine rotation speed TGT_EREV, the time constant Tc is set to a small value.

After setting the initial value ST_TC of the time constant Tc in the step S41, S43 or S44, the controller terminates the subroutine.

Now, referring back to FIG. 6, after determining the initial value ST_TC of the time constant Tc in the step S25, or when the determination result of the step 23 is negative, the controller 12 executes the processing of the step S26.

In the step S26, the controller 12 compares the initial engine rotation speed ST_EREV with the target engine rotation speed TGT_EREV.

When the initial engine rotation speed ST_EREV is equal to or larger than the target engine rotation speed TGT_EREV, the controller 12 executes the processing of a step S27. When on the other hand, the initial engine rotation speed ST_EREV is less than the target engine rotation speed TGT_EREV, the controller 12 executes the processing of a step S29 and subsequent steps.

In the step S27, the controller 12 calculates the target relative rotation speed $\omega_{SLPT}$ using Equation (10) below.

$$\omega_{SLPT} = TGT\_EREV - PriREV \quad (10)$$

In order assure the target relative rotation speed $\omega_{SLPT}$ to take a positive value, the calculation result in Equation (10) is limited by the target relative rotation speed lower limit LMT_SREV calculated in the step S22. After the processing of the step S27, the controller executes the processing of a step S28.

In the step S29, the controller determines if the initial relative rotation speed ST_SREV is larger than or equal to a predetermined target change-over relative rotation speed set value CHG_SREV_SET. The predetermined target change-over relative rotation speed set value CHG_SREV_SET is herein set to 40 revolutions per minute (rpm) when the throttle opening TVO is 1/8, and to 120 revolutions per minute (rpm) when the throttle opening TVO is 8/8.

When the determination result is affirmative, the controller executes the processing of a step S30, and when the determination result is negative, the controller 12 executes the processing of a step S31.

In the step S30, the controller 12 sets a target change-over relative rotation speed CHG_SREV to equal the predetermined target change-over relative rotation speed set value CHG_SREV_SET. The target change-over relative rotation speed CHG_SREV is a value used for calculating a target change-over input rotation speed CHG_PREV of the automatic transmission 3 at which the calculation method of the target relative rotation speed $\omega_{SLPT}$ is changed over.

In the step S31, the controller 12 sets the target change-over relative rotation speed CHG_SREV to equal the initial relative rotation speed ST_SREV. By limiting the target change-over relative rotation speed CHG_SREV to less than the initial relative rotation speed ST_SREV, the target relative rotation speed $\omega_{SLPT}$ is prevented from increasing beyond the initial relative rotation speed ST_SREV as the lockup operation of the lockup clutch 2c progresses. Furthermore as long as the upper limiting of the target change-over relative rotation speed CHG_SREV is operative, since the initial relative rotation speed ST_SREV and the target change-over relative rotation speed CHG_SREV are always equal, the target relative rotation speed $\omega_{SLPT}$ takes a constant value. Therefore, the variation in the output of the feedforward compensator is suppressed, and deterioration in the control characteristics of the lockup clutch 2c due to unexpected decreases in the output of the feedforward compensator in the low relative rotation region can be prevented.

After setting the target change-over relative rotation speed CHG_SREV in the step S30 or in the step S31, the controller 12 calculates the target change-over input rotation speed CHG_PREV of the automatic transmission 3 using Equation (11) below in a step S32.

$$CHG\_PREV = TGT\_EREV - CHG\_SREV \quad (11)$$

In a next step S33, the controller 12 determines if the input rotation speed PriREV of the automatic transmission 3 is larger than or equal to the target change-over input rotation speed CHG_PREV.

When the determination result is affirmative, the controller 12 calculates the target relative rotation speed $\omega_{SLPT}$ in the step S27 as described above.

When the determination result is negative, the controller 12 calculates the target relative rotation speed $\omega_{SLPT}$ in a step S34 using Equation (12) below.

$$\omega_{SLPT} = CHG\_SREV + (ST\_SREV - CHG\_SREV) \cdot \frac{CHG\_PREV - PriREV}{CHG\_PREV - ST\_PREV} \quad (12)$$

Herein, CHG_PREV is target change-over input rotation speed of the automatic transmission 3 calculated in the step S32, ST_PREV is the initial input rotation speed of the automatic transmission 3 stored in the memory in the step S24, and PriREV is the current input rotation speed of the of the automatic transmission 3.

In the following step S28, by referring to a map having the characteristics shown in FIG. 15, the controller determines the time constant Tc.

According to this map, the time constant Tc decreases from the initial value ST_TC which was determined in the step S25 according to the relation between the engine rotation speed EngREV and the target engine rotation speed TGT_EREV, towards a constant value ED_TC. The characteristics of the time constant Tc to decrease is defined by a first order delay with a predetermined time constant CHG_TC. After setting the time constant Tc in the step S28, the controller terminates the subroutine.

FIGS. 16A–16E show an example of the control results according to the above control by the controller 12 in a case where the engine rotation speed EngREV is larger than the target engine rotation speed TGT_EREV at the timing when the feedback control of the differential pressure (PA−PR) starts.

After a throttle of the engine 1 opens at a time t0, the engine rotation speed EngREV and the input rotation speed PriREV of the automatic transmission 3 both increase, and the vehicle speed VSP also increases. The vehicle speed VSP exceeds 5 km/hr at a time t1, then the determination in the step S2 in FIG. 4 becomes affirmative and the controller 12 starts to perform an open loop control of the differential pressure.

At a time t2, the difference between the target engine rotation speed TGT_EREV and the input rotation speed PriREV of the automatic transmission 3, in other words, the real relative rotation speed $\omega_{SLPR}$, equals the open-loop control cessation determination speed $\omega_{SLPMAP}$.

As a result, the determination result in the step S10 of FIG. 4 becomes affirmative, and the feedback control of the relative rotation speed starts. Since the engine rotation speed EngREV is larger than the target engine rotation speed TGT_EREV, the controller 12 sets the target relative rotation speed $\omega_{SLPT}$ to equal the difference between the target engine rotation speed TGT_EREV and the input rotation speed PriREV of the automatic transmission 3 in the step S27 of FIG. 6. Afterwards, the controller 12 feedback controls the differential pressure (PA−PR) on the basis of the difference between the real relative rotation speed $\omega_{SLPR}$ and the target relative rotation speed $\omega_{SLPT}$. According to this control, the relative rotation speed $\omega_{SLPR}$ smoothly decreases and reaches a value of zero at a time t4 as shown in FIG. 16A FIGS. 17A–17E and FIGS. 18A–18E show examples of the control results according to the above control by the controller 12 in a situation where the engine rotation speed EngREV at the time t2 when the feedback control of the differential pressure (PA−PR) is started is smaller than the target engine rotation speed TGT_EREV.

FIGS. 24A–24E show the control results in a similar situation according to the prior art device. According to the prior art device, when the engine rotation speed EngREV is smaller than the target engine rotation speed TGT_EREV as shown in FIG. 24A when the feedback control of the differential pressure (PA−PR) starts, and does not increase as expected due to an upward gradient, for example, the reference model output for the target relative rotation speed may increase immediately after the start of control as shown in FIG. 24B. As a result, the target engine rotation speed TGT_REV undergoes a conspicuous increase as shown by the dotted line in FIG. 24A. In order to realize the target engine rotation speed TGT_REV, the differential pressure applied to the lockup clutch 2c is lowered as shown in FIG. 25E and smooth engagement of the lockup clutch is not possible.

Figure 6:
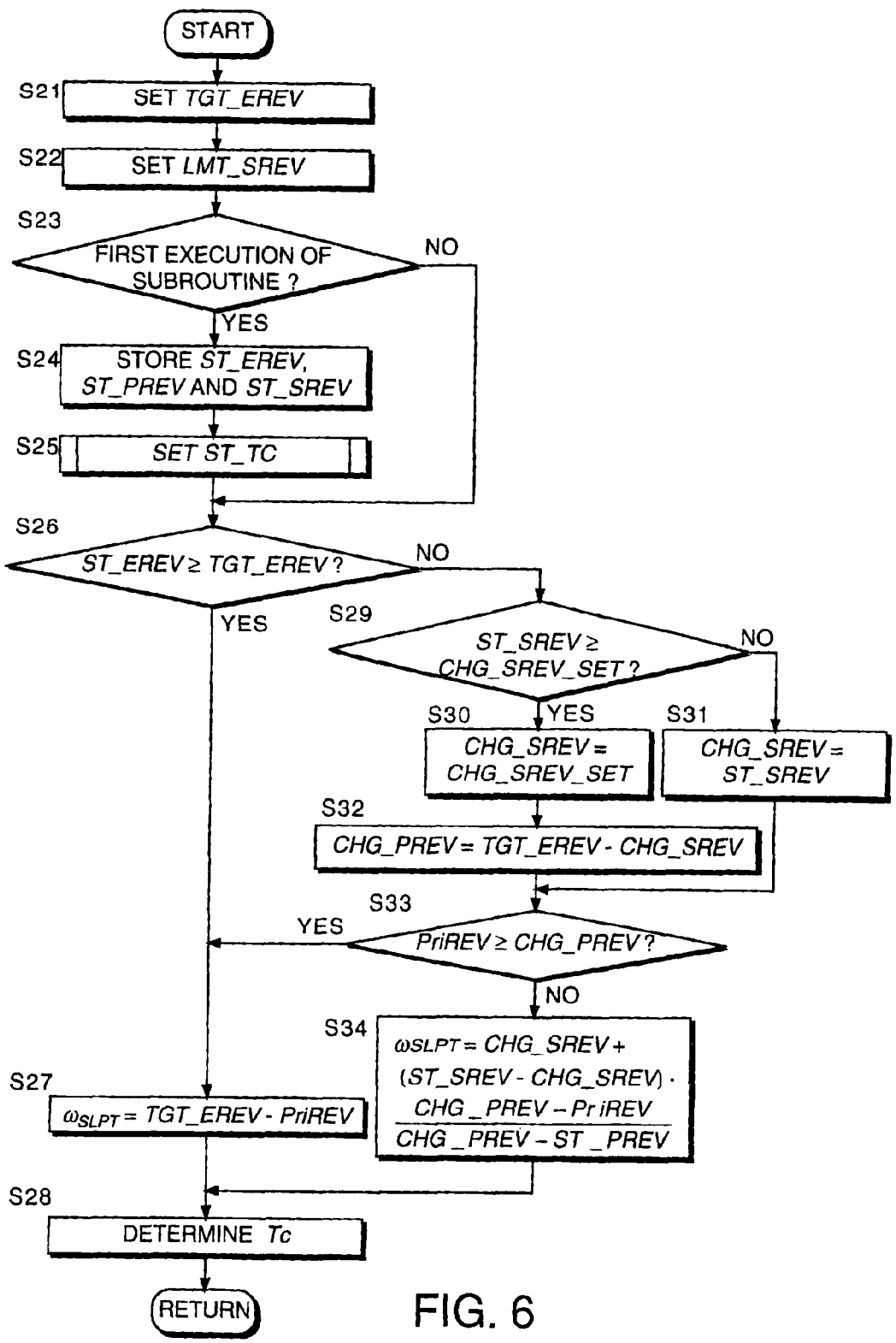
FIG. 6 is a flowchart describing a subroutine for setting a target relative rotation speed $\omega_{SLPT}$ and a time constant Tc executed by the controller.

However, according to the target relative rotation speed setting subroutine of FIG. 6 of this invention, the controller 12 compares the engine rotation speed EngREV with the target engine rotation speed TGT_EREV in the step S26. If the engine rotation speed EngREV is smaller than the target engine rotation speed TGT_EREV, the controller 12 does not use the target engine rotation speed TGT_EREV for setting the target relative rotation speed $\omega_{SLPT}$, but uses the target change-over relative rotation speed CHG_SREV which is the smaller of the predetermined target change-over relative rotation speed set value CHG_SREV_SET and the initial relative rotation speed ST_SREV. The controller 12 sets the target relative rotation speed $\omega_{SLPT}$ in the step S34 using the target change-over relative rotation speed CHG_SREV. This operation is continued, until the input rotation speed PriREV of the automatic transmission 3 becomes larger than the target change-over input rotation speed CHG_PREV.

As a result, the target relative rotation speed $\omega_{SLPT}$ does not increase as in the prior art device even when the engine rotation speed EngREV is smaller than the target engine rotation speed TGT_EREV. Consequently, smooth engagement of the lockup clutch 2c is ensured.

In the case of FIGS. 17A–17E, in which the initial relative rotation speed ST_SREV is larger than the predetermined target change-over relative rotation speed set value CHG_SREV_SET, the controller 12 sets the target change-over relative rotation speed CHG_SREV to equal the predetermined target change-over relative rotation speed set value CHG_SREV_SET in the step S30.

Until a time t3, the input rotation speed PriREV of the automatic transmission 3 is smaller than the target change-over relative rotation speed CHG_SREV, so the target relative rotation speed $\omega_{SLPT}$ is set in the step S34 such that it converges to the target change-over relative rotation speed CHG_SREV from the initial relative rotation speed ST_SREV.

At the time t3, the input rotation speed PriREV of the automatic transmission 3 reaches the target change-over input rotation speed CHG_PREV, and thereafter the target relative rotation speed $\omega_{SLPT}$ is set equal to the difference between the target engine rotation speed TGT_EREV and the input rotation speed PriREV of the automatic transmission 3 in the step S27 similar to the case of the FIGS. 16A–16E.

Figure 18:
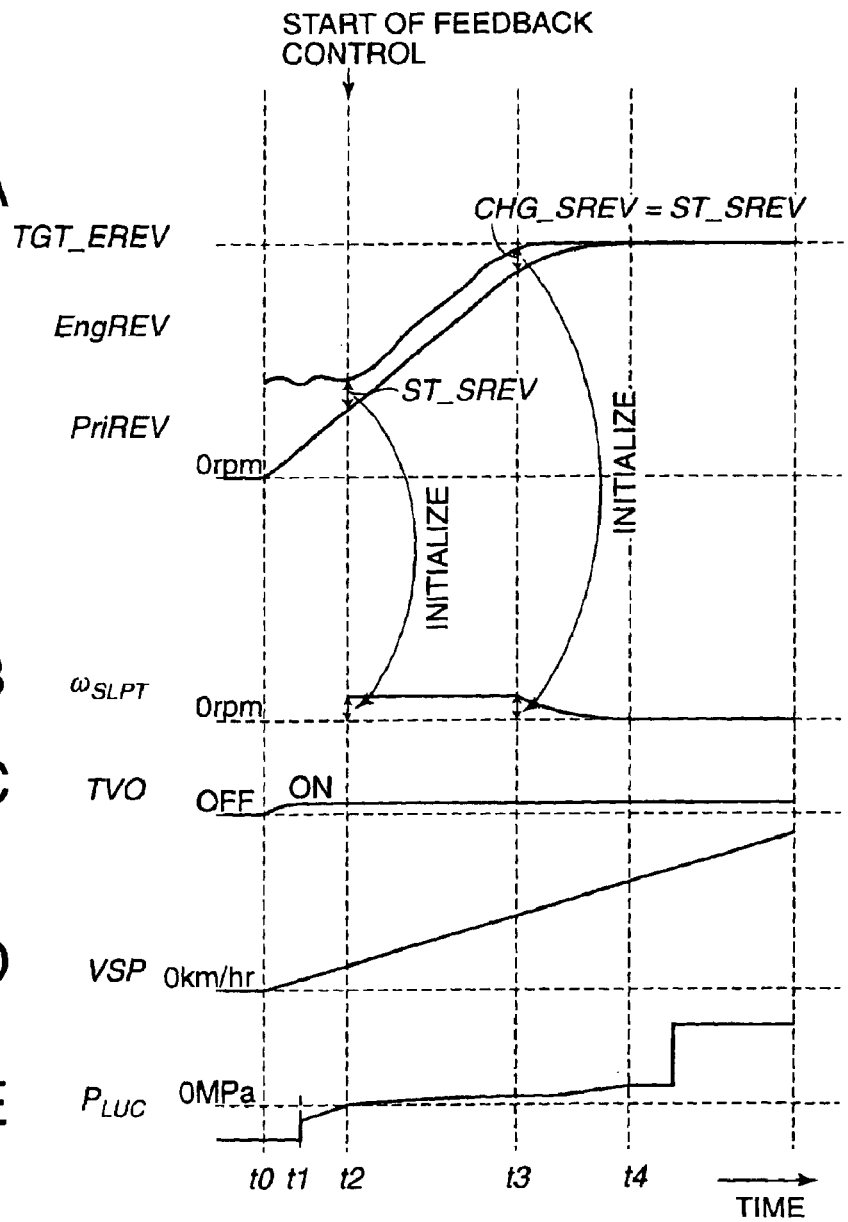
FIGS. 18A–18E are similar to FIGS. 17A–17E, but showing a case where a target change-over relative rotation speed CHG_SREV is limited by the initial relative rotation speed ST_SREV.

In the case of FIGS. 18A–18E, in which the initial relative rotation speed ST_SREV is smaller than the predetermined target change-over relative rotation speed set value CHG_SREV SET, the controller 12 sets the target change-over relative rotation speed CHG_SREV to equal the initial relative rotation speed ST_SREV. Until the time t3, therefore, the target relative rotation speed $\omega_{SLPT}$ set in the step S34 takes a constant value as shown in FIG. 18B. In other words, the differential pressure (PA−PR) does not increase until the engine rotation speed EngREV becomes large enough to fully engage the lockup clutch 2c. After the time t3, the same processing as in the case of FIGS. 16A–16E or FIGS. 17A–17E is applied until the time t4 when the lockup clutch 2c completes lockup operation.

Next, referring to FIGS. 19A–19F, FIGS. 20A–20F and FIGS. 21A–21F, the effect of varying the time constant Tc will be described.

FIGS. 19A–19E also shows an example of control resulting in the engine rotation speed EngREV being larger than the target engine rotation speed TGT_EREV at the commencement of feedback control on the differential pressure (PA−PR).

Figure 19:
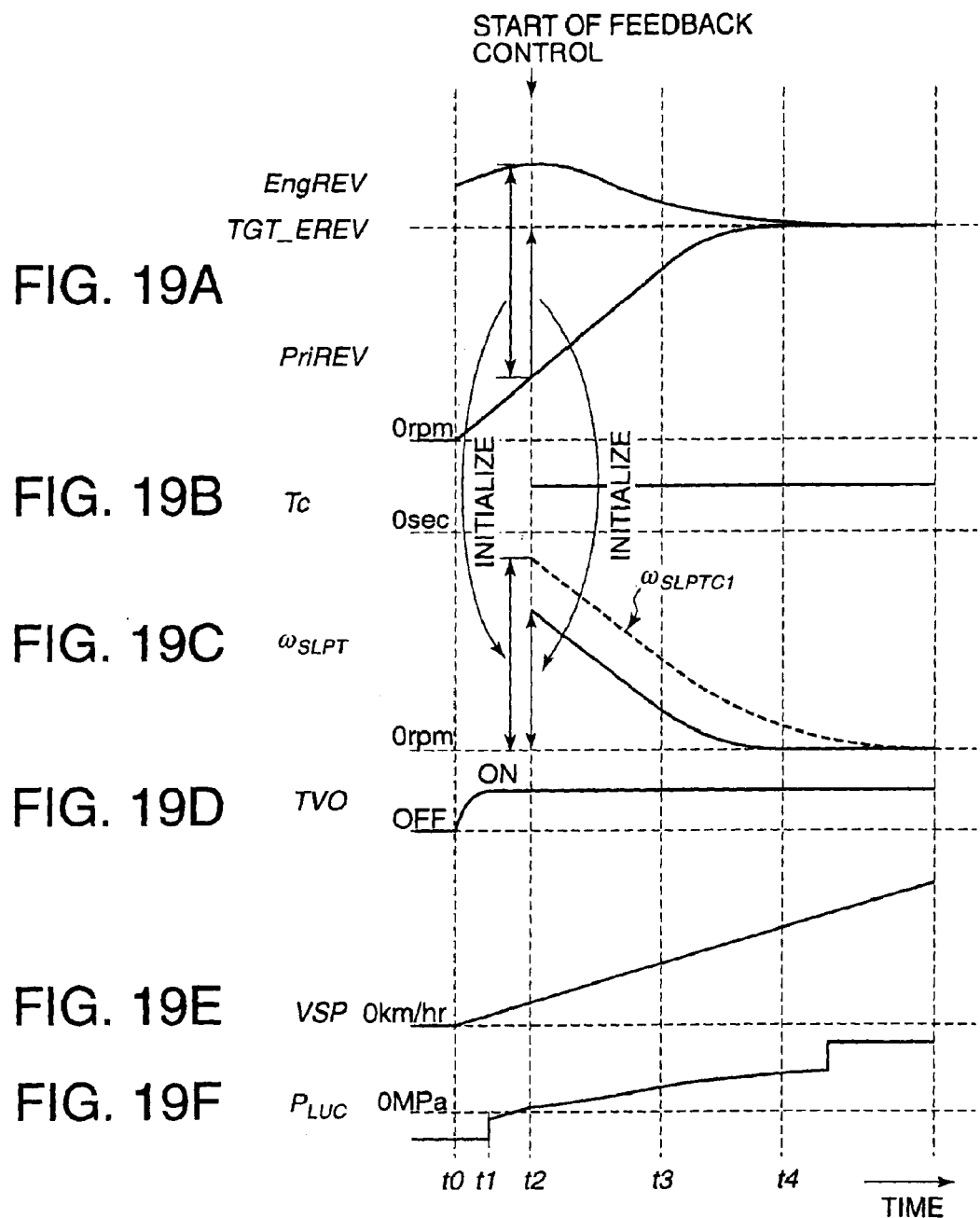
FIGS. 19A–19F are timing charts describing a result of the engaging force control performed by the controller in a case where the time constant Tc is set to have a large value.
Figure 20:
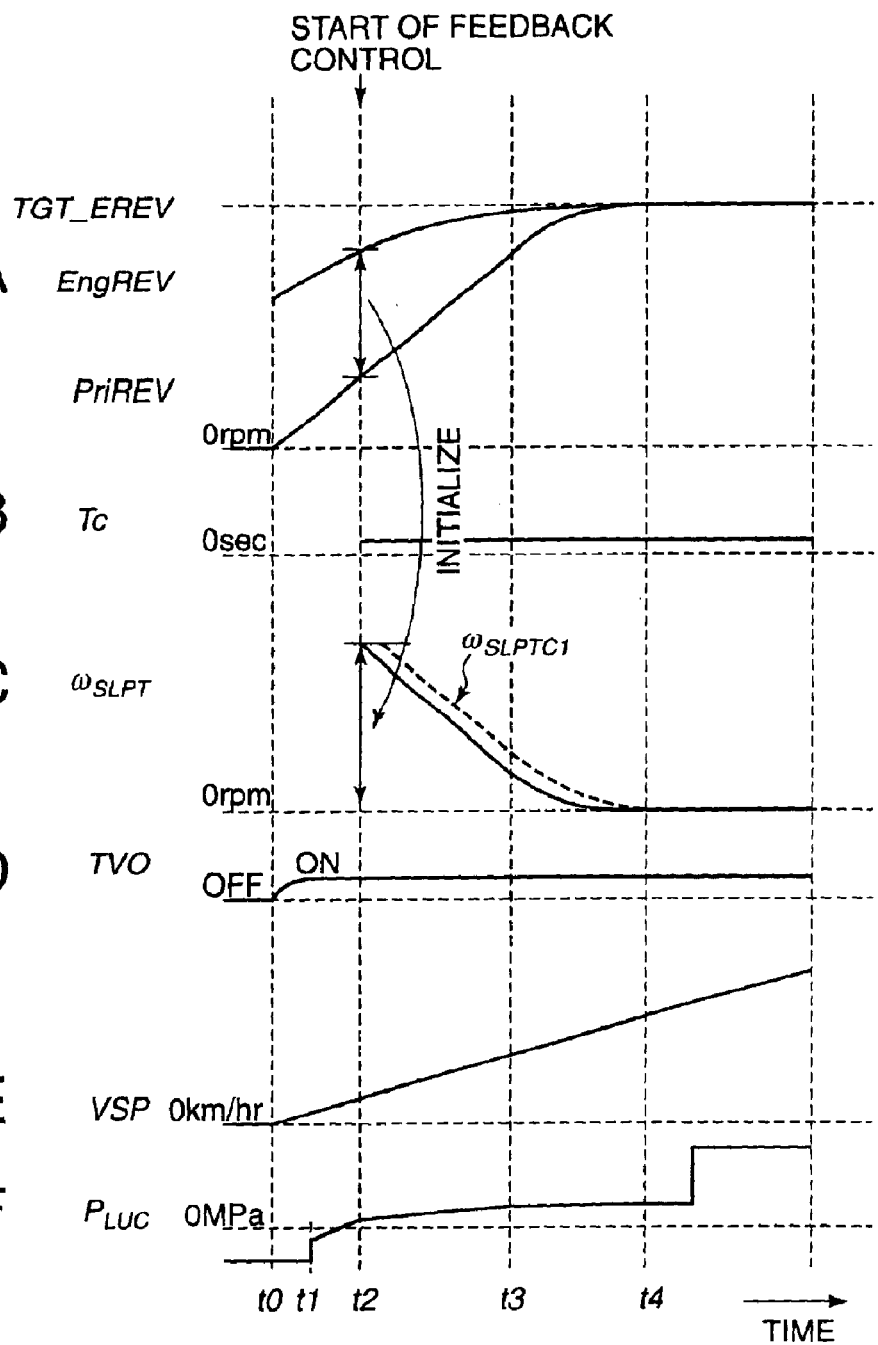
FIGS. 20A–20F are similar to FIGS. 19A–19F, but showing a case where the time constant Tc is set to have a small value.
Figure 21:
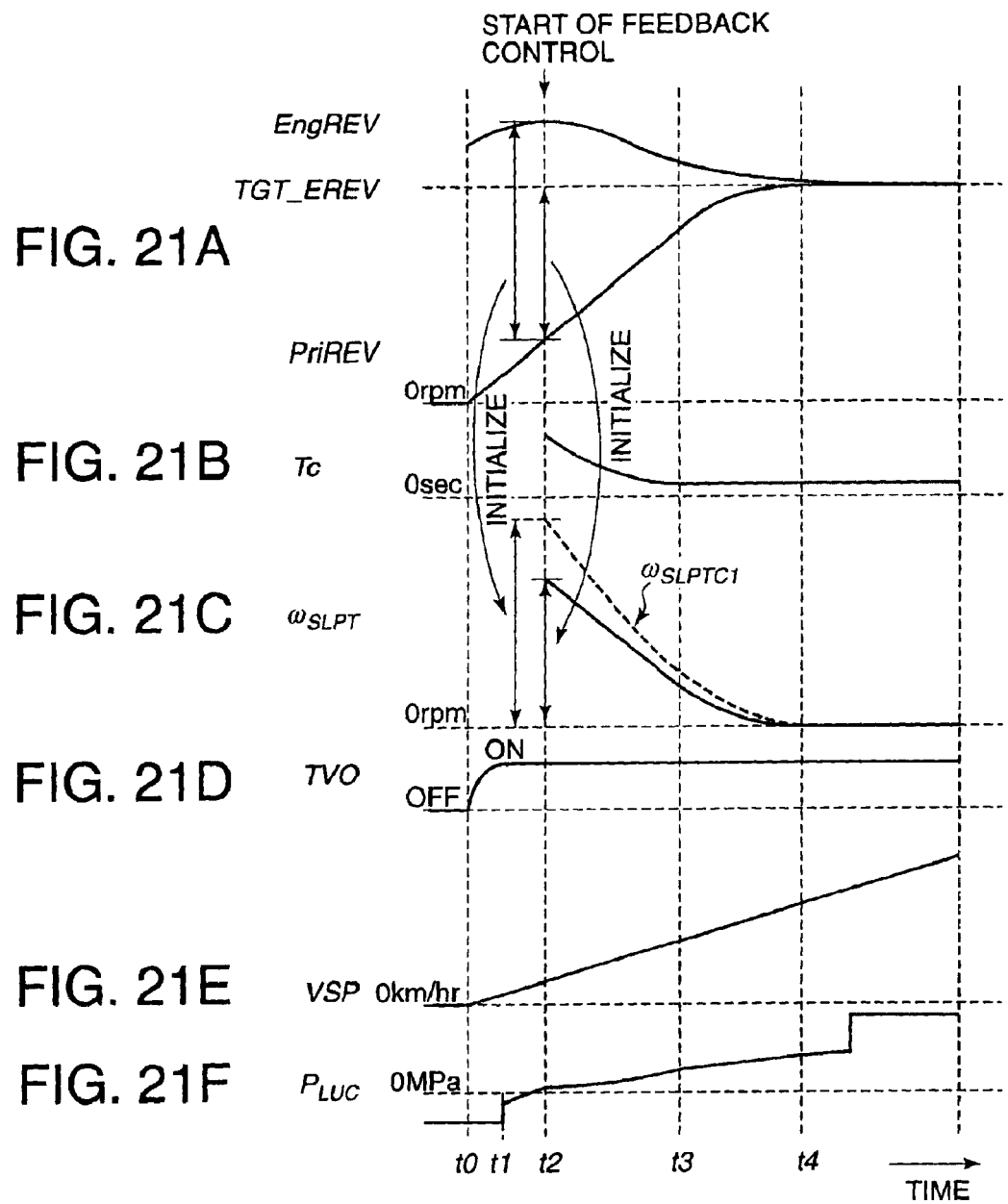
FIGS. 21A–21F are similar to FIGS. 19A–19F, but showing a case where the time constant Tc is set to vary.

In this case, the initial value of the first target relative rotation speed $\omega_{SLPTC1}$ at the time t2 is set to equal the difference between the engine rotation speed EngREV and the input rotation speed PriREV as shown in FIGS. 19A and 19C. Since the initial value of the first target relative rotation speed $\omega_{SLPTC1}$ is set to equal the real relative rotation speed $\omega_{SLPR}$, there is a large deviation $\omega_{SLPER}$ between the first target relative rotation speed $\omega_{SLPTC1}$ and the target relative rotation speed $\omega_{SLPT}$ at the time t2 as shown in FIG. 19C.

According to the subroutine of FIG. 7, the initial value ST_TC of the time constant Tc is set to equal the maximum value ST_TC_MAX in the step S41 when the engine rotation speed EngREV is larger than the sum of the target engine rotation speed TGT_EREV and a maximum deviation EngERR. However, if the time constant Tc continue to take large values such as the maximum value ST_TC_MAX until the end of the feedback control of the differential pressure (PA−PR), a considerable time period will be required for the first target relative rotation speed $\omega_{SLPTC1}$ to equal the target relative rotation speed $\omega_{SLPT}$. Consequently control response characteristics will be poor.

When the engine rotation speed EngREV is smaller than the target engine rotation speed TGT_EREV at the time t2 as shown in FIGS. 20A–20F, the initial value ST_TC of the time constant Tc is set to equal the minimum value ST_TC_MIN in the step S44 of FIG. 7. In this case even if the time constant Tc is fixed to the minimum value ST_TC_MIN throughout the feedback control period, there is no problem with respect to the control response of the differential pressure (PA−PR), because the first target relative rotation speed $\omega_{SLPTC1}$ is quite close to the target relative rotation speed $\omega_{SLPT}$ at the time t2.

In order to make the first target relative rotation speed $\omega_{SLPTC1}$ smoothly and rapidly converge to the target relative rotation speed $\omega_{SLPT}$, the time constant Tc is set to decrease from the initial value ST_Tc as time elapses in the step S28. FIGS. 21A–21F show the control results with the time constant Tc set in this way.

According to these variation characteristics in the time constant Tc, the response in the feedback control of the differential pressure (PA−PR) can be improved due to the fact that the first target relative rotation speed $\omega_{SLPTC1}$ smoothly approaches the real relative rotation speed $\omega_{SLPR}$.

Next, referring to FIG. 22 and FIGS. 23A–23F, a second embodiment of this invention will be described.

According to the first embodiment, the target relative rotation speed $\omega_{SLTP}$ and the time constant Tc were determined by the subroutine of FIG. 6. According to this embodiment, they are determined differently according to the vehicle speed VSP by executing a subroutine of FIG. 22 in the step S15 of FIG. 4.

Figure 22:
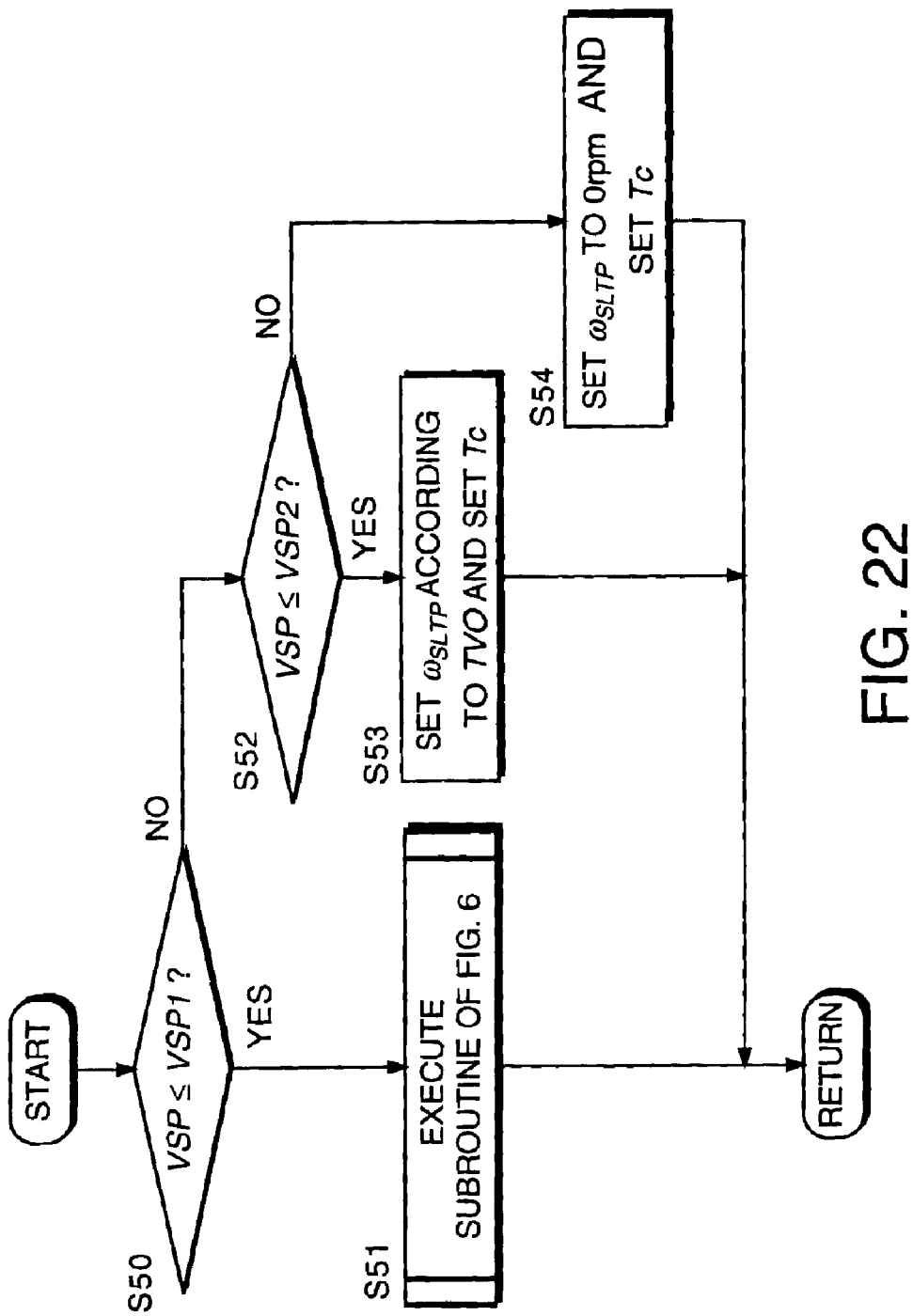
FIG. 22 is a flowchart describing a subroutine for changing over a target relative rotation speed $\omega_{SLTP}$ and the time constant Tc executed by a controller according to a second embodiment of this invention.

Referring to FIG. 22, in a first step S50, the controller 12 determines if the vehicle speed VSP is equal to or less than a predetermined first speed VSP1.

When the vehicle speed VSP is equal to or less than the predetermined first speed VSP1, in a step S51, the controller 12 determines the target relative rotation speed $\omega_{SLTP}$ and the time constant Tc by executing the subroutine of FIG. 6 as the first embodiment.

When the vehicle speed VSP is larger than the predetermined first speed VSP1, in a step S52, the controller 12 determines if the vehicle speed VSP is equal to or less than a predetermined second speed VSP2.

When the vehicle speed VSP is equal to or less than the predetermined second speed VSP2, the controller 12 sets the target relative rotation speed $\omega_{SLTP}$ and the time constant Tc in a step S53. Herein, the target relative rotation speed $\omega_{SLTP}$ is set according to the throttle opening TVO.

When the target relative rotation speed $\omega_{SLTP}$ is larger than the predetermined second speed VSP2, in a step S54, the controller 12 sets the target relative rotation speed $\omega_{SLTP}$ to zero revolutions per minute and sets an appropriate time constant Tc according to vehicle running conditions.

In the above subroutine, the predetermined first speed VSP1 corresponds to a vehicle speed immediately previous to the up-shift operation of the automatic transmission 3. The predetermined second speed VSP2 corresponds to a vehicle speed at a timing when the input rotation speed of the automatic transmission 3 has become stable after up-shifting. The predetermined second speed VSP2 is naturally larger than the predetermined first speed VSP1. The values for the predetermined first and second vehicle speeds VSP1 and VSP2 are determined on the basis of the speed change schedule applied to the automatic transmission 3.

By determining the values of VSP1 and VSP2 in this way, the change-over of the setting methods of the target relative rotation speed $\omega_{SLTP}$ and the time constant Tc is well adapted to the upshift of the automatic transmission 3.

FIGS. 23A–23 show an example of the control results obtained through the execution of the subroutine of FIG. 22. During the time period from t2 to t3, the feedback control of the differential pressure (PA−PR) is performed in the same way as in the first embodiment.

After the time t3 when the vehicle speed VSP reaches the predetermined first speed VSP1 as shown in FIG. 23E, the target relative rotation speed $\omega_{SLTP}$ is set according to the throttle opening TVO and the time constant Tc is set equal to a fixed value.

After the time t4 when the vehicle speed VSP reaches the predetermined second speed VSP2 as shown in FIG. 23E, the target relative rotation speed $\omega_{SLTP}$ is set to zero revolutions per minute and the time constant Tc is set equal to another fixed value.

According to this embodiment, since the upshift timing of the automatic transmission 3 is reflected in the feedback control of the differential pressure (PA−PR) of the lockup clutch 2c, it is possible to complete the lockup operation of the lockup clutch 2c at a constant vehicle speed irrespective of the upshift timing of the automatic transmission 3.

The contents of Tokugan 2002-312405, with a filing date of Oct. 28, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the first embodiment described above, Equation (12) is used to calculate the target relative rotation speed $\omega_{SLPT}$, but it is also possible to set the target relative rotation speed $\omega_{SLPT}$ to vary from the real relative rotation speed $\omega_{SLPR}$ at the commencement of feedback control towards the target change-over relative rotation speed CHG_SREV. The calculation is enabled by using an interpolation coefficient defined according to the input rotation speed PriREV of the automatic transmission 3 or an elapsed time after the start of feedback control. The map of the interpolation coefficient may be prestored in the memory (ROM) of the controller 12 for this purpose.

In addition, instead of applying Equation (9) to calculate the initial value ST_TC of the time constant Tc, it is possible to set the initial value ST_TC between the maximum value ST_TC_MAX and the minimum value ST_TC_MIN by applying an interpolation coefficient. The interpolation coefficient is defined according to the degree of deviation of the engine rotation speed EngREV from the target engine rotation speed TGT_EREV. The map of the interpolation coefficient may be prestored in the memory (ROM) of the controller 12 for this purpose.

Figure 15:
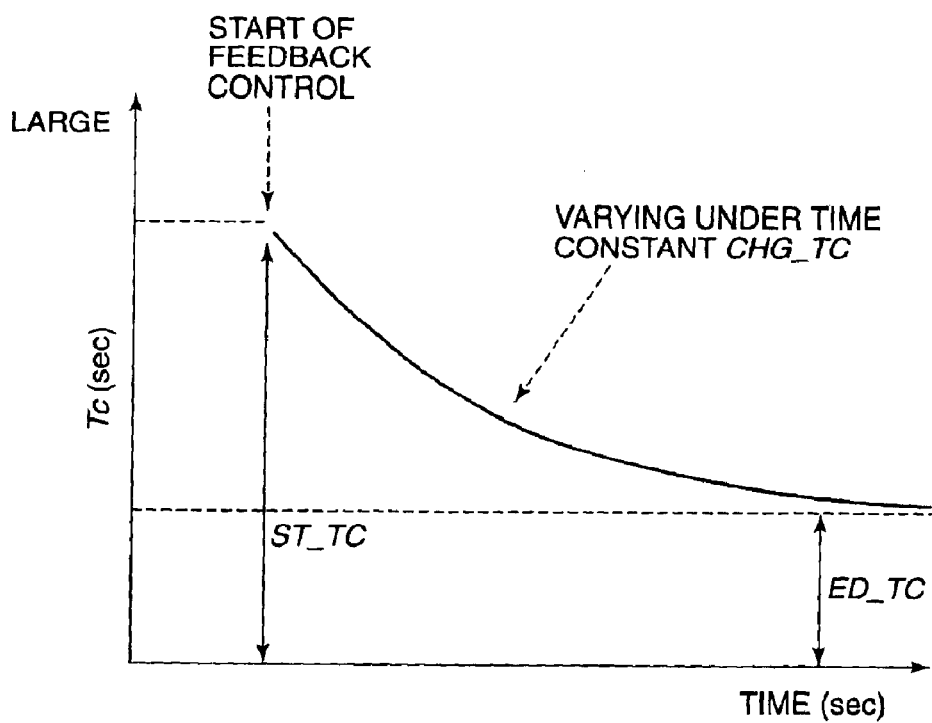
FIG. 15 is a diagram describing the characteristics of a map of the time constant Tc stored by the controller.
Figure 16:
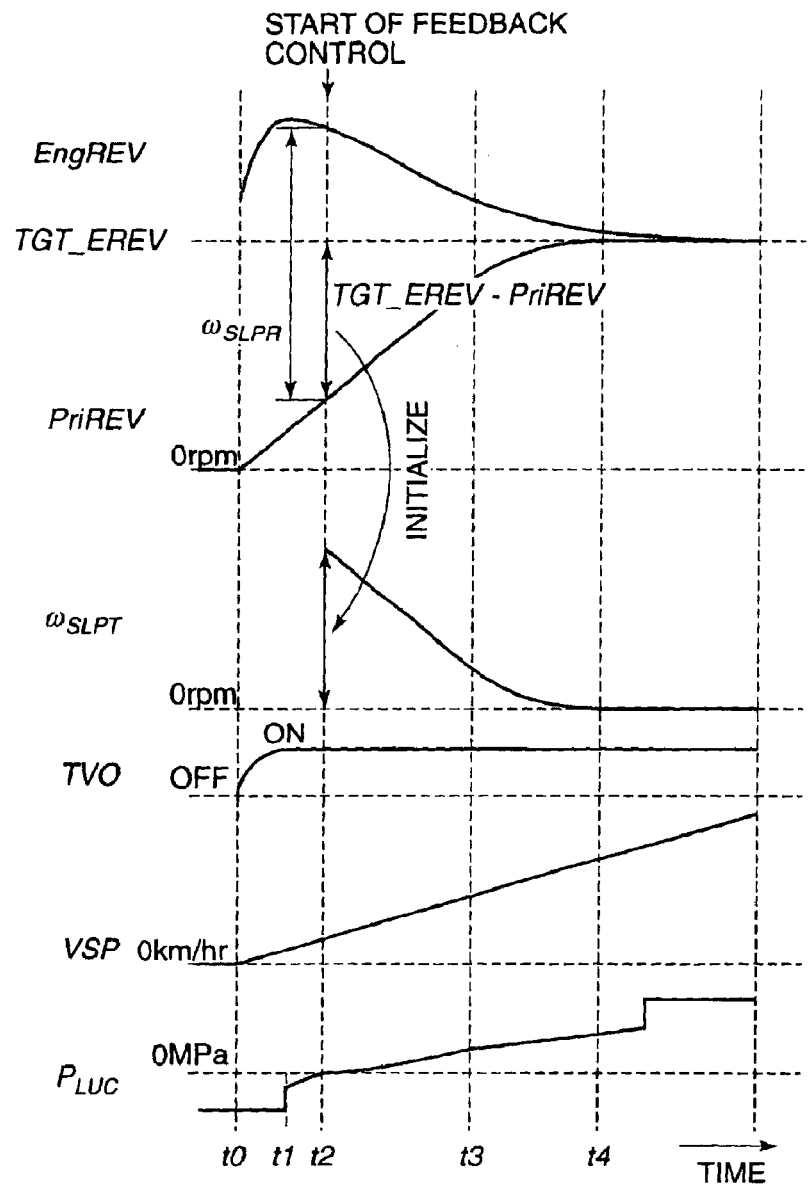
FIGS. 16A–16E are timing charts describing a result of the engaging force control performed by the controller when an initial engine rotation speed ST_EREV is larger than the target engine rotation speed TGT_EREV.
Figure 17:
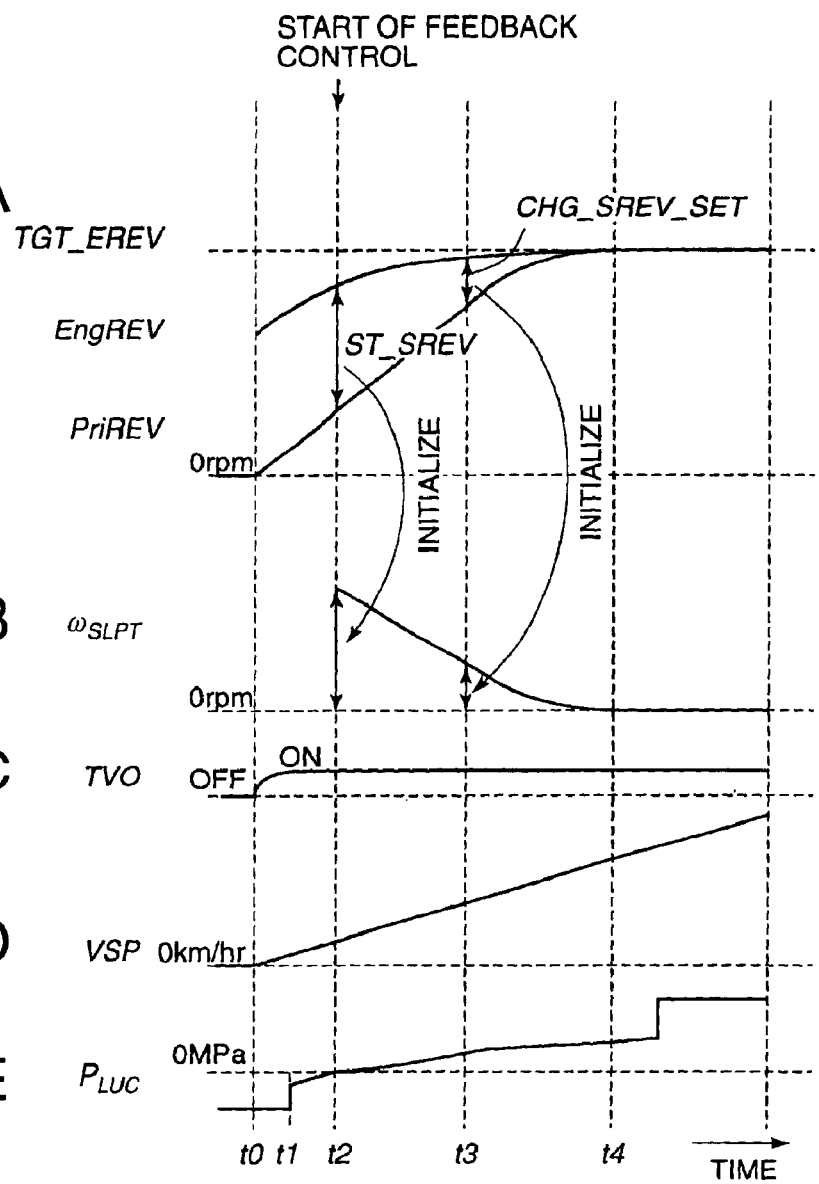
FIGS. 17A–17E are similar to FIGS. 16A–16E, but showing a case where the initial engine rotation speed ST_EREV is not larger than the target engine rotation speed TGT_EREV

Instead of varying the time constant Tc by applying a first-order delay filter shown in FIG. 15, it may be varied according to the time elapsed from the start of feedback control. It is possible to set different time constants according to the vehicle running conditions.

Further, with respect to the detection of the input rotation speed of the automatic transmission 3 that is equal to the rotation speed $\omega_{TR}$ of the turbine runner 2b, it is preferable to process the signals output from the turbine rotation sensor 23 by a filter to remove noise or oscillations.

In the second embodiment, the target relative rotation speed $\omega_{SLTP}$ is set equal to zero revolutions per minute in the step S54 in FIG. 22. In a vehicle where the lockup clutch is not fully engaged for a while after a vehicle start, it is possible to set the target relative rotation speed $\omega_{SLTP}$ to any other value to maintain the lockup clutch 2 in a partially engaged state.

With respect to the feedback control functions of the controller 12 shown in FIG. 3, the engine output torque $t_{ES}$ may be provided via a signal circuit from an engine controller controlling the operation of the engine 1, instead of estimating the engine output torque $t_{ES}$ in the controller 12 from the engine rotation speed EngREV and throttle opening TVO by referring to a map.

In each of the above embodiments, the parameters required for control are detected using sensors, but this invention can be applied to any engaging force control device which can perform the claimed control using the claimed parameters regardless of how the parameters are acquired.

The embodiments of this invention in which an exclusive property or privilege is claimed are defined as follows:

What is claimed is:

1. An engaging force control device of a lockup clutch for use with a torque converter for a vehicle, the lockup clutch engaging a pump impeller connected to an engine with a turbine runner connected to an input shaft of an automatic transmission according to an engaging force, comprising:

a sensor which detects an engine rotation speed (EngREV);

a sensor which detects an input rotation speed (PriREV) of the automatic transmission;

an engaging force regulating mechanism which regulates the engaging force of the lockup clutch; and a programmable controller programmed to:

calculate a relative rotation speed ($\omega_{SLPR}$) of the pump impeller and the turbine runner from the engine rotation speed (EngREV) and the input rotation speed (PriREV) of the automatic transmission;

compare an initial engine rotation speed (ST_EREV) which corresponds to an engine rotation speed when control of the engaging force is started, with a predetermined target engine rotation speed (TGT_EREV);

set a target relative rotation speed ($\omega_{SLPT}$), when the initial engine rotation speed (ST_EREV) is equal to or greater than the predetermined target engine rotation speed (TGT_EREV), according to a difference between the target engine rotation speed (TGT_EREV) and the input rotation speed (PriREV) of the automatic transmission;

set the target relative rotation speed ($\omega_{SLPT}$), when the initial engine rotation speed (ST_EREV) is smaller than the predetermined target engine rotation speed (TGT_EREV), to gradually vary from an initial relative rotation speed (ST_EREV) which corresponds to the relative rotation speed ($\omega_{SLPR}$) of the pump impeller and the turbine runner when control of the engaging force is started, to a predetermined target change-over relative rotation speed (CHG_SREV); and control the engaging force regulating mechanism such that the relative rotation speed ($\omega_{SLPR}$) coincides with the target relative rotation speed ($\omega_{SLPT}$).

2. The engaging force control device as defined in claim 1, wherein the controller is further programmed to set the predetermined target change-over relative rotation speed (CHG_SREV) to equal a fixed relative rotation speed (CHG_SREV_SET) when the initial relative rotation speed (ST_SREV) is equal to or greater than the fixed relative rotation speed (CHG_SREV_SET), and to set the predetermined target change-over relative rotation speed (CHG_SREV) to equal the initial relative rotation speed (ST_SREV) when the initial relative rotation speed (ST_SREV) is smaller than the fixed relative rotation speed (CHG_SREV_SET).

3. The engaging force control device as defined in claim 1, wherein the controller is further programmed to calculate a target input rotation speed (CHG_PREV) by subtracting the target change-over relative rotation speed (CHG_SREV) from the target engine rotation speed (TGT_EREV), compare the input rotation speed (PreREV) with the target input rotation speed (CHG_PREV), and set the target relative rotation speed ($\omega_{SLPT}$) to equal a difference between the target engine rotation speed (TGT_EREV) and the input rotation speed (PriREV) when the input rotation speed (PriREV) is equal to or greater than the target input rotation speed (CHG_PREV).

4. The engaging force control device as defined in claim 1, wherein the controller is further programmed to set a time constant initial value (ST_TC), when the initial engine rotation speed (ST_EREV) is greater than the target engine rotation speed (TGT_EREV), to a larger value than a time constant initial value (ST_TC) that is set when the initial engine rotation speed (ST_EREV) is smaller than the target engine rotation speed (TGT_EREV), set a time constant (Tc) to a value which decreases from the time constant initial value (ST_TC) as time elapses from when the control of the engaging force is started, calculate a target relative rotation speed correction value ($\omega_{SLPT}$) by applying a first-order delay processing to the target relative rotation speed ($\omega_{SLPT}$) under the time constant (Tc), and control the engaging force regulating mechanism to cause the relative rotation speed ($\omega_{SLPR}$) to coincide with the target relative rotation speed correction value ($\omega_{SLPTC}$).

5. The engaging force control device as defined in claim 1, wherein the controller is further programmed to set the time constant initial value (ST_TC) to equal a predetermined maximum value (ST_TC_MAX) when the initial engine rotation speed (ST_ERE1) is equal to or greater than a sum of the target engine rotation speed (TGT_EREV) and a predetermined maximum deviation (EngERR), set the time constant initial value (ST_TC) to equal a predetermined minimum value (ST_TC_MIN) when the initial engine rotation speed (ST_EREV) is smaller than the target engine rotation speed (TGT_EREV), and set the time constant initial value (ST_TC) to a value between the predetermined maximum value (ST_TC_MAX) and the predetermined minimum value (ST_TC_MIN) according to a difference between the engine rotation speed (EngREV) and the target engine rotation speed (EGT_EREV) when the initial engine rotation speed (ST_EREV) is equal to or greater than the target engine rotation speed (TGT_EREV) and smaller than the sum of the target engine rotation speed (TGT_EREV) and the predetermined maximum deviation (EngERR).

6. The engaging force control device as defined in claim 1, wherein the engaging force control device further comprises a throttle sensor which detects an throttle opening of the engine, and the controller is further programmed to set the target engine rotation speed (TGT_EREV) to increase as the throttle opening (TVO) increases.

7. The engaging force control device as defined in claim 1, wherein the automatic transmission is arranged to upshift at a predetermined first speed (VSP1), the engaging force control device further comprises a throttle sensor which detects an throttle opening (TVO) of the engine and a vehicle speed sensor which detects a vehicle speed (VSP), and the controller is further programmed to set the target relative rotation speed ($\omega_{SLPT}$) according to the throttle opening (TVO) when the vehicle speed (VSP) is greater than the predetermined first speed (VSP1).

8. The engaging force control device as defined in claim 7, wherein the controller is further programmed to set the target relative rotation speed ($\omega_{SLPT}$) to zero revolutions per minute, when the vehicle speed (VSP) is larger than a predetermined second speed (VSP2) which is larger than the predetermined first speed (VSP1).

9. An engaging force control device of a lockup clutch for use with a torque converter for a vehicle, the lockup clutch engaging a pump impeller connected to an engine with a turbine runner connected to an input shaft of an automatic transmission according to an engaging force, comprising:

means for determining an engine rotation speed (EngREV);

means for determining an input rotation speed (PriREV) of the automatic transmission;

means for regulating the engaging force of the lockup clutch;

means for calculating a relative rotation speed ($\omega_{SLPR}$) of the pump impeller and the turbine runner from the engine rotation speed (EngREV) and the input rotation speed (PriREV) of the automatic transmission;

means for comparing an initial engine rotation speed (ST_EREV) which corresponds to an engine rotation speed when control of the engaging force is started, with a predetermined target engine rotation speed (TGT_EREV);

means for setting a target relative rotation speed ($\omega_{SLPT}$), when the initial engine rotation speed (ST_EREV) is equal to or greater than the predetermined target engine rotation speed (TGT_EREV), according to a difference between the target engine rotation speed (TGT_EREV) and the input rotation speed (PriREV) of the automatic transmission;

means for setting the target relative rotation speed ($\omega_{SLPT}$), when the initial engine rotation speed (ST_EREV) is smaller than the predetermined target engine rotation speed (TGT_EREV), to gradually vary from an initial relative rotation speed (ST EREV which corresponds to the relative rotation speed ($\omega_{SLPR}$) of the pump impeller and the turbine runner when control of the engaging force is started, to a predetermined target change-over relative rotation speed (CHG_SREV); and means for controlling the engaging force regulating means such that the relative rotation speed ($\omega_{SLPR}$) coincides with the target relative rotation speed ($\omega_{SLPT}$).

10. An engaging force control method of a lockup clutch for use with a torque converter for a vehicle, the lockup clutch engaging a pump impeller connected to an engine with a turbine runner connected to an input shaft of an automatic transmission according to an engaging force regulated by an engaging force regulating mechanism, the method comprising:

determining an engine rotation speed (EngREV);

determining an input rotation speed (PriREV) of the automatic transmission;

calculating a relative rotation speed ($\omega_{SLPR}$) of the pump impeller and the turbine runner from the engine rotation speed (EngREV) and the input rotation speed (PriREV) of the automatic transmission;

comparing an initial engine rotation speed (ST_EREV) which corresponds to an engine rotation speed when control of the engaging force is started, with a predetermined target engine rotation speed (TGT_EREV);

setting a target relative rotation speed ($\omega_{SLPT}$), when the initial engine rotation speed (ST_EREV) is equal to or greater than the predetermined target engine rotation speed (TGT_EREV), according to a difference between the target engine rotation speed (TGT_EREV) and the input rotation speed (PriREV) of the automatic transmission;

setting the target relative rotation speed ($\omega_{SLPT}$), when the initial engine rotation speed (ST_EREV) is smaller than the predetermined target engine rotation speed (TGT_EREV), to gradually vary from an initial relative rotation speed (ST_EREV) which corresponds to the relative rotation speed ($\omega_{SLPR}$) of the pump impeller and the turbine runner when control of the engaging force is started, to a predetermined target change-over relative rotation speed (CHG_SREV); and controlling the engaging force regulating mechanism such that the relative rotation speed ($\omega_{SLPR}$) coincides with the target relative rotation speed ($\omega_{SLPT}$).

* * * * *